US011542346B2

(12) United States Patent
Izmer et al.

(10) Patent No.: US 11,542,346 B2
(45) Date of Patent: Jan. 3, 2023

(54) CATALYSTS FOR OLEFIN POLYMERIZATION

(71) Applicant: BOREALIS AG, Vienna (AT)

(72) Inventors: Vyatcheslav V. Izmer, Moscow (RU); Dmitry S. Kononovich, Moscow (RU); Alexander Z. Voskoboynikov, Moscow (RU); Ville Virkkunen, Porvoo (FI); Luigi Maria Cristoforo Resconi, Linz (AT)

(73) Assignee: Borealis AG, Vienna (AT)

(*) Notice: Subject to any disclaimer, the term of this patent is extended or adjusted under 35 U.S.C. 154(b) by 248 days.

(21) Appl. No.: 16/982,006

(22) PCT Filed: Mar. 18, 2019

(86) PCT No.: PCT/EP2019/056737
§ 371 (c)(1),
(2) Date: Sep. 17, 2020

(87) PCT Pub. No.: WO2019/179959
PCT Pub. Date: Sep. 26, 2019

(65) Prior Publication Data
US 2021/0017307 A1 Jan. 21, 2021

(30) Foreign Application Priority Data
Mar. 19, 2018 (EP) .................... 18162549

(51) Int. Cl.
| C07F 17/00 | (2006.01) |
| C08F 4/6592 | (2006.01) |
| C08F 110/06 | (2006.01) |
| C08F 210/06 | (2006.01) |
| C08F 10/06 | (2006.01) |

(52) U.S. Cl.
CPC .............. *C08F 10/06* (2013.01); *C07F 17/00* (2013.01); *C08F 4/65927* (2013.01); *C08F 2420/01* (2013.01)

(58) Field of Classification Search
CPC .... C07F 17/00; C08F 4/65927; C08F 110/06; C08F 210/06
See application file for complete search history.

(56) References Cited

U.S. PATENT DOCUMENTS

| 6,057,408 | A | 5/2000 | Winter et al. |
| 6,252,019 | B1 | 6/2001 | Ewen et al. |
| 10,167,355 | B2 | 1/2019 | Ajellal et al. |
| 10,301,411 | B2 | 5/2019 | Ajellal et al. |
| 2005/0288461 | A1 | 12/2005 | Jensen et al. |
| 2008/0081887 | A1 | 4/2008 | Wang et al. |
| 2012/0123078 | A1 | 5/2012 | Lee et al. |
| 2014/0206819 | A1 | 7/2014 | Hafner et al. |
| 2014/0221584 | A1 | 8/2014 | Hafner et al. |
| 2017/0037164 | A1 | 2/2017 | Ajellal et al. |
| 2017/0037165 | A1 | 2/2017 | Ajellal et al. |
| 2017/0081431 | A1 | 3/2017 | Suzuki et al. |
| 2017/0342175 | A1 | 11/2017 | Hagadorn et al. |
| 2019/0308995 | A1 | 10/2019 | Ajellal et al. |

FOREIGN PATENT DOCUMENTS

| CN | 102574885 A | 7/2012 |
| CN | 104854143 A | 8/2015 |
| EP | 1858907 B1 | 10/2008 |
| EP | 2532687 A2 | 12/2012 |
| EP | 2657285 A1 | 10/2013 |
| EP | 2722346 A1 | 4/2014 |
| EP | 2933275 A1 | 10/2015 |
| EP | 2933277 A1 | 10/2015 |
| EP | 2729529 B1 | 4/2016 |
| EP | 1548018 B1 | 10/2018 |
| EP | 2511305 B1 | 5/2019 |
| EP | 2813517 B2 | 6/2019 |
| WO | 1994/014856 | 7/1994 |
| WO | 1995/012622 | 5/1995 |
| WO | 97/14727 A1 | 4/1997 |
| WO | 1998/040331 | 9/1998 |
| WO | 00/09515 A1 | 2/2000 |
| WO | 00/24792 A1 | 5/2000 |
| WO | 00/24793 A1 | 5/2000 |
| WO | 2002/002576 | 1/2002 |
| WO | 03/49856 A1 | 6/2003 |
| WO | 2003/051934 | 6/2003 |
| WO | 03050131 A1 | 6/2003 |

(Continued)

OTHER PUBLICATIONS

Klimke, Katja, et al. "Optimisation and Application of Polyolefin Branch Quantification by Melt-State 13C NMR Spectroscopy." Macromolecular Chemistry and Physics 207.4 (2006): 382-395.

Parkinson, Matthew, et al. "Effect of Branch Length on 13C NMR Relaxation Properties in Molten Poly [ethylene-co-(α-olefin)] Model Systems." Macromolecular Chemistry and Physics 208.19-20 (2007): 2128-2133.

Castignolles, Patrice, et al. "Detection and quantification of branching in polyacrylates by size-exclusion chromatography (SEC) and melt-state 13C NMR spectroscopy." Polymer 50.11 (2009): 2373-2383.

Pollard, M., et al. "Observation of chain branching in polyethylene in the solid state and melt via 13C NMR spectroscopy and melt NMR relaxation time measurements." Macromolecules 37.3 (2004): 813-825.

(Continued)

*Primary Examiner* — Caixia Lu
(74) *Attorney, Agent, or Firm* — Meunier Carlin & Curfman LLC

(57) ABSTRACT

New bisindenyl ligand complexes and catalysts comprising those complexes. The invention is directed to improving the manufacturing of specific C1-symmetric bisindenyl complexes by modifying one of the indenyl ligands in order to improve the selectivity of the complex synthesis towards the desired anti-isomer, increase the yield and simplify the purification of the complex. The invention also relates to the use of the new bisindenyl metallocene catalysts for the production of polypropylene homopolymers or propylene copolymers.

12 Claims, No Drawings

(56) References Cited

FOREIGN PATENT DOCUMENTS

| WO | 03/102042 A1 | 12/2003 |
|---|---|---|
| WO | 2006069733 A1 | 7/2006 |
| WO | 2006/097497 | 9/2006 |
| WO | 2006100258 A1 | 9/2006 |
| WO | 2007/116034 | 10/2007 |
| WO | 2007122098 A1 | 11/2007 |
| WO | 2009/054831 | 4/2009 |
| WO | 2010/052260 | 5/2010 |
| WO | 2010/052263 | 5/2010 |
| WO | 2010/052264 | 5/2010 |
| WO | 2011/076780 | 6/2011 |
| WO | 2011076443 A1 | 6/2011 |
| WO | 2011/135004 | 11/2011 |
| WO | 2011135005 A2 | 11/2011 |
| WO | 2012/001052 | 1/2012 |
| WO | 2012001051 A1 | 1/2012 |
| WO | 2012/084961 | 6/2012 |
| WO | 2012075560 A1 | 6/2012 |
| WO | 2013/007650 | 1/2013 |
| WO | 2014060541 A1 | 4/2014 |
| WO | 2014/096171 | 6/2014 |
| WO | 2015011135 A1 | 1/2015 |
| WO | 2015/158790 | 10/2015 |
| WO | 2015/158791 | 10/2015 |
| WO | 2016038210 A1 | 3/2016 |
| WO | 2016038211 A1 | 3/2016 |
| WO | 2018091684 A1 | 5/2018 |
| WO | 2018108917 A1 | 6/2018 |
| WO | 2018108918 A1 | 6/2018 |
| WO | 2018/122134 | 7/2018 |
| WO | 2019002345 A1 | 1/2019 |
| WO | 2019052820 A1 | 3/2019 |

OTHER PUBLICATIONS

Filip, Xenia, et al. "Heteronuclear decoupling under fast MAS by a rotor-synchronized Hahn-echo pulse train." Journal of Magnetic Resonance 176.2 (2005): 239-243.

Griffin, John M., et al. "Low-load rotor-synchronised Hahn-echo pulse train (RS-HEPT) 1H decoupling in solid-state NMR: factors affecting MAS spin-echo dephasing times." Magnetic Resonance in Chemistry 45.S1 (2007): S198-S208.

Resconi, Luigi, et al. "Selectivity in propene polymerization with metallocene catalysts." Chemical Reviews 100.4 (2000): 1253-1346.

Del Hierro, P.; Ortin, A.; Monrabal, B.; Soluble Fraction Analysis in polypropylene, The Column, Feb. 2014. pp. 18-23.

International Search report and Written Opinion issued for Application No. PCT/EP2019/056737, dated Apr. 16, 2019.

Busico, V. et al., "Alk-1-ene polymerization in the presence of a monocyclipentadienyl zirconium (IV) acetamidinate catalyst: Microstructural and mechanistic insights", Macromolecular Rapid Communications 2007, 28(10), 1128-1134.

Busico, V. et al., "Full assignment of the 13C NMR spectra of regioregular polypropylenes: Methyl and methylene region", Macromolecules, 1997, 30(20), 6251-6263.

Busico, V. et al., "Microstructure of polypropylene", Progress in Polymer Science, 2001, 26(3), 443-533.

Cheng, "Carbon-13NMR analysis of ethylene-propylene rubbers", Macromolecules, 1984, 17, 1950-1955.

Chukanova, et al., "Polymerization of propylene using isospecific rac-Me2Si(2-Me,4-Phlnd)2ZrCl2 catalyst immobilized on polyethylene with grafted poly(acrylic acid)", Polymer science. Series A, Chemistry, physics 43.8 (2001): 787-792.

Endres, et al., "Die fluorige Phase: Organische Chemie mit hochfluorierten Reagenzien und Lösungsmitteln", Chemie in unserer Zeit, 2000, 34(6), 382-393.

Ewen, et al., "Crystal structures and stereospecific propylene polymerizations with chiral hafnium metallocene catalysts", JACS, 1987, 109, 6544-6545.

Ewen, et al., "Evaluation of the dimethylsilyl-bis(2-methyl-4-phenyl-1-indenyl) ligand with group 4 triad metals in propene polymerizations with methylaluminoxane", Macromolecular Rapid Communications vol. 19, Issue 1, Jan. 1998, pp. 71-73.

Gahleitner, et al., "Crystallinity and mechanical properties of PPhomopolymers as influenced by molecular structure and nucleation", Journal of Applied Polymer Science, 1996, 61(4), 649-657.

Grein, et al., "Impact modified isotactic polypropylene with controlled rubber intrinsic viscosities: Some new aspects about morphology and fracture", Journal of Applied Polymer Science, 2003, 87(10), 1702-1712.

Hasegawa, et al., "High-temperature ethylene/alpha-olefin copolymerization with a zirconene catalyst: Effects of the zirconene ligand and polymerization conditions on copolymerization behavior", Journal of Polymer Science: Part A; Polymer Chemistry, 2000, 38, 4641-4648.

Hintermann, et al., "Expedient Syntheses of the N-hetercyclic carbene precursor imidazolium salts IPr•HCl and IXy•HCl," Beilstein J. Org. Chem. 2007, 3, 1-5.

Hopf, et al., "Highly syndiotactic polypropene with Cs-symmetric metallocene/MAO catalysts", Catalysis Communications, 2002, 2, 459.

Kaminsky, et al., "Polymerization of Ethene and Longer Chained Olefins by Metallocene Catalysis", Macromol Symp 2005, 226, 25.

Kim, et al., "Ethylene/1-Hexene Copolymerizations of Syndioselective Metallocenes: Direct Comparison of Me2C(Cp)(Flu)ZrMe2 with Et(Cp)(Flu)ZrMe2", J POlym Sci Part A Polym Chem, 1999, 37, 2763.

Kuklin, et al., "Quantitative structure-property relationships in propene polymerization by zirconenes with a rac-SiMe2[Ind]2 based ligand frameworks", Journal of Melcular Catalysis A: Chemical, 2016, 412, 39-46.

Liu, et al., "Poly(ethylene-co-1-octene) Characterization by High-Temperature Multidimensional NMR at 750 MHz", Macromolecules 2001, 34, 4757-4767.

Lo Nostro, , "Phase separation properties of fluorocarbons, hydrocarbons and their copolymers", Advances in Colloid and Interface Science, 1995, 56, 245-287.

Matsubara, et al., "Synthesis and Structures of Nickel Halide Complexes Bearing Mono- and Bis-coordinated N-Heterocyclic Carbene Ligands, Catalyzing Grignard Cross-Coupling Reactions", Organometallics, 2006, 25 (14), pp. 3422-3427.

Hubner, et al., "Application of Melt-State NMR Spectroscopy for Polyolefin Characterization in Industry," NMR Spectroscopy of Polymers: Innovative Strategies for Complex Macromolecules, Chapter 24, 401 (2011).

Premphet, et al., "Polypropylene/metallocene ethylene-octene copolymer blends with a bimodal particle size distribution: Mechanical properties and their controlling factors", Journal of Applied Polymer Science, 2002, 85(11), 2412-2418.

Qui, et al., "Improved Peak Assignments for the 13C NMR Spectra of Poly(ethylene-co-1-octene)s", Macromolecules 2007, 40, 6879-6884.

Randall, J.C."A Review of High Resolution Liquid 13Carbon Nuclear Magnetic Resonance Characterizations of Ethylene-Based Polymers", Journal of Macromolecular Science, Part C: Polymer Reviews, vol. 29, Issues 2-3, 1989, pp. 201-317.

Singh, et al., "Triad sequence determination of ethylene-propylene copolymers—application of quantitative 13C NMR", Polymer Testing, 2009, 28(5), 475.

Song, "Synthesis of aryl-substituted indanones and indenes via a highly efficient ligand-free palladium-catalyzed Suzuki coupling process", ARKIOVIC, 2016, 4, 306-327.

Stadler, et al., "Influence of Type and Content of Various Comonomers on Long-Chain Branching of Ethene/alpha-olefin Copolymers", Macromolecules, 2006, 39, 1474.

Stork, et al., "The Stereochemistry of the SN2' Reaction. I. Preparation of Pure trans-6-Alkyl-2-cyclohexen-1-ols", J. Am. Chem. Soc. 1956, 78, 4604-4608.

Tynys, et al., "Propylene polymerisations with novel heterogeneous combination metallocene catalyst systems", Polymer, 2007, 48, 1893-1902.

(56) References Cited

OTHER PUBLICATIONS

Ushakova, et al., "Ethylene polymerization and ethylene-1-hexene copolymerization over immobilized metallocene catalysts", Kinetics and Catalysis, Feb. 2012, vol. 53, Issue 1, pp. 75-83.

Wang, et al., "Long Chain Branching in Ethylene Polymerization Using Binary Homogeneous Metallocene Catalyst System", Polymer Reaction Engineering, vol. 7, 1999—Issue 3, pp. 327-346.

Wang, et al., "Structural Analysis of Ethylene/Propylene Copolymers Synthesized with a Constrained Geometry Catalyst", Macromolecules, 2000, 33(4), 1157-1162.

Yano, et al., "Effect of ligand structures on high temperature homo- and copolymerization of ethylene by cationic hafnocene catalysts based on tetrakis(pentafluorophenyl)borate", Journal of Molecular Catalysis A: Chemical, 2000, 156(1-2), 133-141.

Yano, et al., "Ethylene/1-hexene copolymerization with Ph2C(Cp)(Flu)ZrCl2 derivatives: correlation between ligand structure and copolymerization behavior at high temperature", Macromolecular Chemistry and Physics, 1999, 200, 1542.

Yano, "Novel zirconocene catalysts for the production of high molecular weight LLDPE in high-temperature polymerization", Macromolecular Chemistry and Physics, 1999, 200(4), 933-941.

Zhou, et al., "A new decoupling method for accurate quantification of polyethylene copolymer composition and triad sequence distribution with 13C NMR.", J Magn Reson. Aug. 2007;187(2):225-33. Epub May 23, 2007.

Nifant'ev, Ilya E. et al., "5-Methoxy-Substituted Zirconium Bis-indenyl ansa-complexes: Synthesis, Structure, and Catalytic Activity in the Polymerization and Copolymerization of Alkenes," Organometallics, 2012, 31, 4962-4970.

First Office Action and Search Report, dated Aug. 17, 2022, received in corresponding CN Patent Application No. 201980033899.8 (and English translation).

CATALYSTS FOR OLEFIN POLYMERIZATION

This invention relates to new bisindenyl ligands, complexes thereof and catalysts comprising those complexes. The invention is directed to improving the manufacturing of specific C1-symmetric bisindenyl complexes by modifying one of the indenyl ligands in order to improve the selectivity of the complex synthesis towards the desired anti-isomer, increase the yield and simplify the purification of the complex. The invention also relates to the use of the new bisindenyl metallocene catalysts for the production of polypropylene homopolymers or propylene copolymers, especially with ethylene, with high activity levels, high molecular weight, and hence low MFR, and with ideal melting points.

Metallocene catalysts have been used to manufacture polyolefins for many years. Countless academic and patent publications describe the use of these catalysts in olefin polymerization. Metallocenes are now used industrially and polyethylenes and polypropylenes in particular are often produced using cyclopentadienyl based catalyst systems with different substitution patterns.

The present inventors sought new metallocenes, which provide high activity, especially in the case of the homopolymerization of propylene or in the case of copolymerization between propylene and ethylene. The desired catalysts should also have improved performance in the production of high melting temperature and high molecular weight polypropylene homopolymers. The desired catalysts should also have improved performance in the production of propylene-ethylene copolymers, for instance having high activity for high Mw copolymer products. The desired catalysts should also provide propylene-ethylene copolymers having high molecular weight.

It is especially desired that the new metallocene catalyst complexes can be produced with improved selectivity of the complex synthesis towards the desired ant-isomer by a simpler and higher yield synthesis than known metallocene catalyst complexes.

Various prior art references aim for one or more of these features.

C2-symmetric metallocenes are disclosed for example in WO2007/116034. This document reports the synthesis and characterisation of, inter alia, the metallocene rac-Me$_2$Si(2-Me-4-Ph-5-OMe-6-tBuInd)$_2$ZrCl2 and the use of it as a polymerization catalyst after activation with MAO for the homopolymerization of propylene and copolymerization of propylene with ethylene and higher alpha-olefins in solution polymerization.

WO02/02576 describes, inter alia, rac-Me$_2$Si[2-Me-4-(3,5-tBu2Ph)Ind]$_2$ZrCl2 and rac-Me$_2$Si[2-Me-4-(3,5-tBu2Ph)Ind]$_2$ZrCl2 (see also WO2014/096171) and its use in the manufacture of high Mw and high melting point polypropylene.

WO06/097497 describes, inter alia, rac-Me$_2$Si(2-Me-4-Ph-1,5,6,7-tetrahydro-s-indacen-1-yl)$_2$ZrCl2 supported on silica and its use in the homo- and copolymerization of propylene with ethylene.

WO2011/076780 describes the use of rac-Me$_2$Si(2-Me-4-Ph-1,5,6,7-tetrahydro-s-indacen-1-yl)$_2$ZrCl2 activated with methylalumoxane in solid particulated form without an external carrier, for propylene homopolymerization U.S. Pat. No. 6,057,408 describes the influence of the 4-aryl substituent on the molecular weight of ethylene-propylene copolymers produced in liquid slurry.

Asymmetrical metallocenes able to produce isotactic polypropylene have been described in the literature. WO2013/007650, describes certain asymmetrical catalysts comprising alkoxy groups at the 5-position of one of the rings such as anti-dimethylsilanediyl(2-methyl-4-phenyl-6-tert-butylinden-1-yl)(2-methyl-4-phenyl-5-methoxy-6-tert-butyl inden-1-yl) zirconium dichloride. Despite its good performance, catalysts based on this reference are limited in terms of polypropylene homopolymer melting temperature, productivity at low MFR. In addition, the overall productivity of the catalyst still needs to be improved.

WO2015/158790 discloses, inter alia, the complex "2-Zr" anti-dimethylsilanediyl[2-methyl-4-(3,5-di-tert-butylphenyl)-5-methoxy-6-tert-butyl-inden-1-yl][2-methyl-4-(3,5-di-tert-butyl-phenyl)-5,6,7-trihydro-s-indacen-1-yl] zirconium dichloride and describes the use of this complex in the formation of ethylene/1-octene copolymers in a solution process. A direct comparison is made between a catalyst system of this metallocene, MAO and Trityl tetrakis(pentafluorophenyl)borate, against equivalent systems in which the metallocene is also C1-symmetric and has two indenyl ligands "1-Zr" anti-dimethylsilylene(2-methyl-4-phenyl-5-methoxy-6-tert-butyl-indenyl)(2-methyl-4-(4-tert-butyl-phenyl)indenyl)zirconium dichloride] or is C2-symmetric and has two indacenyl ligands "3-Zr" dimethylsilylenebis(2-i-butyl-4-(4'-tert-butylphenyl)-5,6,7-trihydro-s-indacen-1-yl)zirconium dichloride. The catalyst system containing 2-Zr is found to be inferior in terms of 1-octene incorporation to those containing 1-Zr and 3-Zr.

WO2009/054831 describes the synthesis of the C2-symmetric complex based on 2-methyl-4,7-di(4'-tert-butylphenyl)indenyl ligands and compares them to the 4-phenyl analogue. Although catalyst productivity, PP molecular weight and melting point are improved by the use of 4,7-di(4'-tert-butylphenyl)indenyl ligands, the absolute value of the melting point remains low and more important both the ligand and the metallocene synthesis yields are very low, showing that this approach has no industrial applicability.

The catalysts of the invention should ideally be suited for use in solution or in conventional solid supported form, e.g. using silica or alumina supports, or can be used in solid form, however, being free of external support or carrier, as described for example in WO03/051934.

The inventors have developed new metallocene catalysts having improved polymerization behaviour, higher catalyst productivity, improved performance in the production of high molecular weight polypropylene homopolymers.

In addition the new metallocene catalyst complexes can be produced with simpler and higher yield synthesis than known metallocene catalyst complexes.

Furthermore, the new metallocene catalyst complexes can be produced with an improved selectivity of the complex synthesis towards the desired ant-isomer.

A number of known metallocene catalyst complexes are set out in the table below:

| Structure | Structure | Structure | Structure |
|---|---|---|---|
| rac-dimethylsilanediylbis[2-methyl-4-(4-tert-butylphenyl)indenyl]zirconium dichloride | rac-anti-dimethylsilanediyl(2-methyl-4-(4'-tert-butylphenyl) inden-1-yl)(2-methyl-4-phenyl-5-methoxy-6-tert-butyl inden-1-yl) zirconium dichloride | rac-anti-dimethylsilanediyl(2-methyl-4-(4-tert-butylphenyl) inden-1-yl)(2-methyl-4-(4'-tert-butylphenyl)-5-methoxy-6-tert-butyl inden-1-yl) zirconium dichloride | rac-anti-dimethylsilanediyl[2-methyl-4-(3',5'-di-tert-butylphenyl)-1,5,6,7-tetrahydro-s-indacen-1-yl][2-methyl-4-(3',5'-di-tert-butylphenyl)-5-methoxy-6-tert-butylinden-1-yl]zirconium dichloride |
| WO98/040331 | WO2013/007650 | WO2013/007650 | WO2015/158790 |
| Anti-dimethylsilanediyl[2-methyl-4-(3,5-dimethylphenyl)-5-methoxy-6-tert-butylinden-1-yl][2-methyl-4-(4-tert-butylphenyl)-1,5,6,7-tetrahydro-s-indacen-1-yl]zirconium dichloride | Anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride | Anti-dimethylsilanediyl[2-methyl-4-(3,5-di-tert-butylphenyl)-5-methoxy-6-tert-butyl-inden-1-yl][2-methyl-4-(3,5-dimethylphenyl)-5,6,7-tihydro-s-indacen-1-yl]zirconium dichloride | |
| WO2018122134 | WO2018122134 | WO2018122134 | |

The metallocene structures above exhibit high catalyst activity and provide high melting polypropylene, and high molecular weight C2/C3 copolymers. However, the syntheses and purification of the pure anti-isomer of these complexes require many steps and have therefore overall low yield, making the manufacturing of such complexes economically not convenient. Therefore, there is still the need to provide metallocene catalyst complexes that, while keeping the good catalytic performance, can also be produced with a more efficient synthesis. In addition, it would be desirable to provide catalysts which have even higher activity, and which provide higher molecular weight polymers. The present invention solves this problem.

The inventors have now found that further modification of the C-symmetric metaliocene ligand structure described in WO2018122134 significantly increases the selectivity of the synthesis towards the desired anti-isomer, simplifies the isolation of the anti-isomer, and increases the overall yield of the pure anti-isomer of the metaliocene complexes.

In addition, the catalytic performance of the new complexes is similar or better compared to the complexes based on the non-modified indenyl ligands.

SUMMARY OF INVENTION

Viewed from one aspect the invention provides a metaliocene catalyst complex of formula (I):

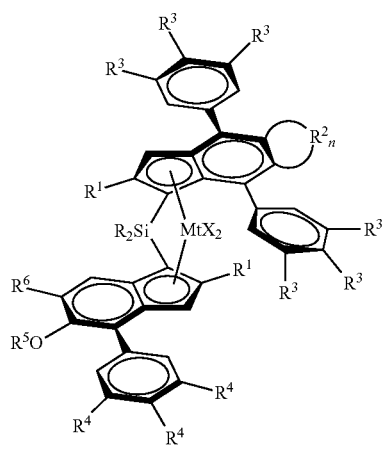

Formula (I)

Mt is Hf or Zr;

each X is a sigma-ligand;

Each $R^1$ independently is the same or can be different and is a $CH_2$—$R^7$ group, with $R^7$ being H, a linear or branched $C_{1-6}$-alkyl group, a $C_{3-8}$ cycloalkyl group, or a $C_{6-10}$ aryl group, Each $R^2$ is independently a —CH═, —CY═, —$CH_2$—, —CHY— or —$CY_2$— group, wherein Y is a $C_{1-10}$ hydrocarbyl group and where n is 2-6, each $R^3$ and $R^4$ are independently the same or can be different and are hydrogen, a linear or branched $C_1$-$C_6$-alkyl group, an OY group, a $C_{7-20}$ arylalkyl, $C_{7-20}$ alkylaryl group, or $C_{6-20}$ aryl group, wherein at least one $R^3$ per phenyl group and at least one $R^4$ is not hydrogen, and optionally two adjacent $R^3$ or $R^4$ groups can be part of a ring including the phenyl carbons to which they are bonded, $R^5$ is a linear or branched $C_1$-$C_6$-alkyl group, $C_{7-20}$ arylalkyl, $C_{7-20}$ alkylaryl group or $C_6$-$C_{20}$-aryl group, $R^6$ is a $C(R^8)_3$ group, with $R^8$ being a linear or branched $C_1$-$C_6$ alkyl group, Each R is independently a $C_1$-$C_{20}$-hydrocarbyl, $C_6$-$C_{20}$-aryl, $C_7$-$C_{20}$-arylalkyl or $C_7$-$C_{20}$-alkylaryl.

Viewed from another aspect the invention provides a metallocene catalyst complex of formula (Ia)

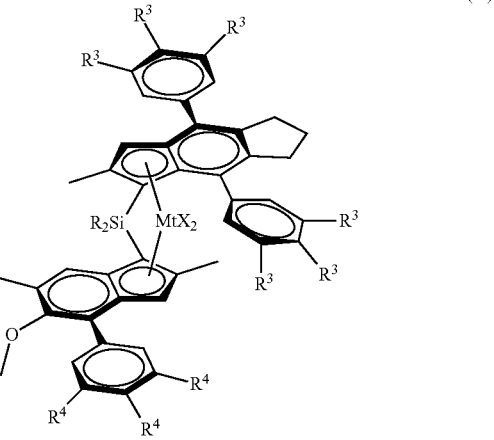

(Ia)

wherein each $R^3$ and $R^4$ are independently the same or can be different and are hydrogen or a linear or branched $C_1$-$C_6$-alkyl group, wherein at least one $R^3$ per phenyl group and at least one $R^4$ is not hydrogen.

Viewed from a further aspect the invention provides a catalyst comprising
  (i) a metallocene catalyst complex of formula (I) or (Ia) as hereinbefore defined; and
  (ii) a cocatalyst comprising a compound of a group 13 metal.

In addition, yet a further aspect of the present invention is a process for producing the ligand of the metallocene catalyst complex of formula (I or Ia) comprising the two $(R^3)_3$-phenyl-group substituents.

The catalyst of the invention can be used in non-supported form or in solid form. The catalyst of the invention may be used as a homogeneous catalyst or heterogeneous catalyst.

The catalyst of the invention in solid form, preferably in solid particulate form, can be either supported on an external carrier material, like silica or alumina, or, in one embodiment, is free from an external carrier, however still being in solid form. For example, the solid catalyst is obtainable by a process in which
  (a) a liquid/liquid emulsion system is formed, said liquid/liquid emulsion system comprising a solution of the catalyst components (i) and (ii) dispersed in a solvent so as to form dispersed droplets; and
  (b) solid particles are formed by solidifying said dispersed droplets.

Viewed from another aspect the invention provides a process for the manufacture of a catalyst as hereinbefore defined comprising obtaining a complex of formula (I) and a cocatalyst as hereinbefore described;
forming a liquid/liquid emulsion system, which comprises a solution of catalyst components (i) and (ii) dispersed in a solvent, and solidifying said dispersed droplets to form solid particles.

Viewed from another aspect the invention provides the use in propylene polymerization of a catalyst as hereinbefore defined, especially for the formation of a polypropylene homopolymer or propylene copolymer, e.g. with ethylene or a C4-10 alpha olefin such as 1-hexene.

According to another embodiment the solid catalyst is supported on an organic or inorganic support material, such as silica, alumina or zirconia or a mixed oxide such as silica-alumina.

Viewed from another aspect the invention provides a process for the polymerization propylene comprising reacting propylene and optional comonomers with a catalyst as hereinbefore described, especially for the formation polypropylene homopolymer or propylene copolymer, e.g. with ethylene or a C4-10 alpha olefin such as 1-hexene.

Definitions

Throughout the description, the following definitions are employed.

By "free from an external carrier" is meant that the catalyst does not contain an external support, such as an inorganic support, for example, silica or alumina, or an organic polymeric support material.

The term "$C_{1-20}$ hydrocarbyl group" includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred $C_{1-20}$ hydrocarbyl groups are $C_{1-20}$ alkyl, $C_{4-20}$ cycloalkyl, $C_5$-cycloalkyl-alkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tert-butyl, isobutyl, $C_{5-6}$-cycloalkyl, cyclohexylmethyl, phenyl or benzyl.

The term "halo" includes fluoro, chloro, bromo and iodo groups, especially chloro or fluoro groups, when relating to the complex definition.

The oxidation state of the metal ion is governed primarily by the nature of the metal ion in question and the stability of the individual oxidation states of each metal ion.

It is appreciated that in the complexes of the invention, the metal ion M is coordinated by ligands X to satisfy the valency of the metal ion and to fill its available coordination sites. The nature of these σ-ligands can vary greatly.

The terms "C4 phenyl ring" and "C4' phenyl ring" relate to the substituted phenyl rings attached to the 4 and 4' positions of the indenyl and indacenyl rings, respectively. The numbering of these rings will be evident from the structures indicated herein.

Catalyst activity is defined in this application to be the amount of polymer produced/g catalyst/h. Catalyst metal activity is defined here to be the amount of polymer produced/g Metal/h. The term productivity is also sometimes used to indicate the catalyst activity although herein it designates the amount of polymer produced per unit weight of catalyst.

The term "molecular weight" is used herein to refer to weight average molecular weight Mw unless otherwise stated.

DETAILED DESCRIPTION OF INVENTION

This invention relates to a series of new ligands, metallocene catalyst complexes and hence catalysts that are ideal for the polymerization of propylene. The metallocene catalyst complexes of the invention are asymmetrical. Asymmetrical means simply that the two ligands forming the metallocene are different, that is, each ligand bears a set of substituents that are chemically different.

The metallocene catalyst complexes of the invention are chiral, racemic bridged bisindenyl $C_1$-symmetric metallocenes in their anti-configuration. Although the complexes of the invention are formally $C_1$-symmetric, the complexes ideally retain a pseudo-$C_2$-symmetry since they maintain $C_2$-symmetry in close proximity of the metal center although not at the ligand periphery. By nature of their chemistry both anti and syn enantiomer pairs (in case of $C_1$-symmetric complexes) are formed during the synthesis of the complexes. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the scheme below.

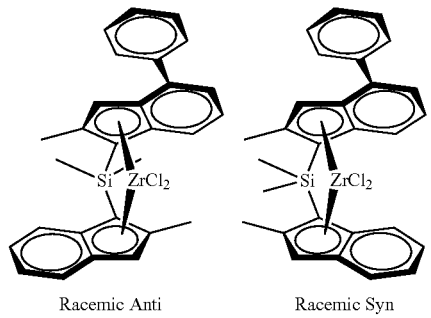

Racemic Anti          Racemic Syn

Formula (I), and any sub formulae, are intended to cover both syn- and anti-configurations. Preferred metallocene catalyst complexes are in the anti configuration.

The metallocene catalyst complexes of the invention are employed as the racemic-anti isomers. Ideally, therefore at least 95% mol, such as at least 98% mol, especially at least 99% mol of the metallocene catalyst complex is in the racemic-anti isomeric form.

In the metallocene catalyst complexes of the invention the following preferences apply.

Metallocene catalyst complexes according to the invention are of formula (I):

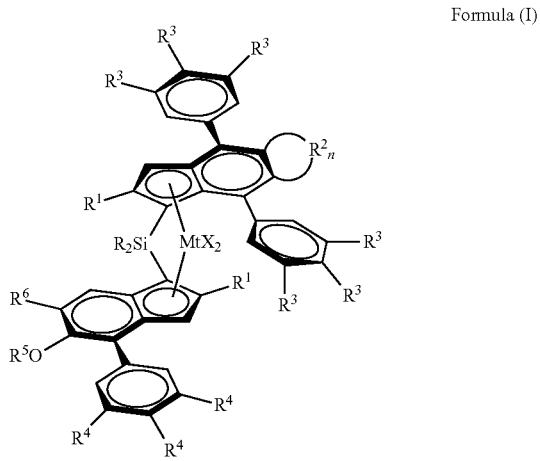

Formula (I)

In a complex of formula (I) it is preferred if Mt is Zr or Hf, preferably Zr;

Each X is a sigma ligand. Most preferably, each X is independently a hydrogen atom, a halogen atom, $C_{1-6}$ alkoxy group or an R' group, where R' is a $C_{1-6}$ alkyl, phenyl or benzyl group. Most preferably, X is chloride, benzyl or a methyl group. Preferably, both X groups are the same. The most preferred options are two chlorides, two methyl or two benzyl groups, especially two chlorides.

In the formula —SiR$_2$—, each R is independently a $C_1$-$C_{20}$-hydrocarbyl, $C_6$-$C_{20}$-aryl, $C_7$-$C_{20}$-arylalkyl or $C_7$-$C_{20}$-alkylaryl. The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl. Unless otherwise stated, preferred $C_{1-20}$ hydrocarbyl groups are $C_{1-20}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups.

Preferably, both R groups are the same. It is preferred if R is a $C_1$-$C_{10}$-hydrocarbyl or $C_6$-$C_{10}$-aryl group, such as methyl, ethyl, propyl, isopropyl, tertbutyl, isobutyl, $C_{5-6}$-cycloalkyl, cyclohexylmethyl, phenyl or benzyl, more preferably both R are a $C_1$-$C_6$-alkyl, $C_{3-8}$ cycloalkyl or $C_6$-aryl group, such as a $C_1$-$C_4$-alkyl, C5-6 cycloalkyl or $C_6$-aryl group and most preferably both R are methyl or one is methyl and another cyclohexyl. Most preferably the bridge is —Si(CH$_3$)$_2$—.

Each $R^1$ independently is the same or can be different and is a CH$_2$—$R^7$ group, with $R^7$ being H, a linear or branched $C_{1-6}$-alkyl group (like methyl, ethyl, n-propyl, i-propyl, n-butyl, i-butyl, sec.-butyl and tert.-butyl), a $C_{3-8}$ cycloalkyl group (e.g. cyclohexyl), or a $C_{6-10}$ aryl group (preferably phenyl);

Preferably, both $R^1$ are the same and are a CH$_2$—$R^7$ group, with $R^7$ being H or a linear or branched $C_1$-$C_4$-alkyl group, more preferably, both $R^1$ are the same and are a CH$_2$—$R^7$ group, with $R^7$ being H or a linear or branched $C_1$-$C_3$-alkyl group. Most preferably, both $R^1$ are both methyl.

Each $R^2$ is independently a —CH=, —CY=, —CH$_2$—, —CHY— or —CY$_2$— group, wherein Y is a $C_{1-10}$ hydrocarbyl group, preferably a $C_{1-4}$ hydrocarbyl group and where n is 2-6, preferably 3-4.

Each substituent $R^3$ and $R^4$ are independently the same or can be different and are hydrogen, a linear or branched $C_1$-$C_6$-alkyl group, an OY group, a $C_{7-20}$ arylalkyl, $C_{7-20}$ alkylaryl group, or $C_{6-20}$ aryl group, preferably hydrogen, a linear or branched $C_1$-$C_6$-alkyl group or $C_{6-20}$ aryl groups, and optionally two adjacent $R^3$ or $R^4$ groups can be part of a ring including the phenyl carbons to which they are bonded. More preferably, $R^3$ and $R^4$ are hydrogen or a linear or branched $C_1$-$C_4$ alkyl group or a OY-group, wherein Y is a is a $C_{1-4}$ hydrocarbyl group. Even more preferably, each $R^3$ and $R^4$ are independently hydrogen, methyl, ethyl, isopropyl, tert-butyl or methoxy, especially hydrogen, methyl or tert-butyl, wherein at least one $R^3$ per phenyl group and at least one $R^4$ is not hydrogen.

Thus, preferably one or two $R^3$ per phenyl group are not hydrogen, more preferably on both phenyl groups the $R^3$ are the same, like 3',5'-di-methyl or 4'-tert-butyl for both phenyl groups. For the indenyl moiety preferably one or two $R^4$ on the phenyl group are not hydrogen, more preferably two $R^4$ are not hydrogen and most preferably these two $R^4$ are the same like 3',5'-di-methyl or 3',5'-di-tert-butyl.

$R^5$ is a linear or branched $C_1$-$C_6$-alkyl group such as methyl, ethyl, n-propyl, i-propyl, n-butyl, i-butyl, sec-butyl and tert-butyl, $C_{7-20}$ arylalkyl, $C_{7-20}$ alkylaryl group or $C_6$-$C_{20}$ aryl group. $R^5$ is a preferably a linear or branched $C_1$-$C_6$ alkyl group or $C_{6-20}$ aryl group, more preferably a linear $C_1$-$C_4$ alkyl group, even more preferably a $C_1$-$C_2$ alkyl group and most preferably methyl.

$R^6$ is a C(R$^8$)$_3$ group, with $R^8$ being a linear or branched $C_1$-$C_6$ alkyl group.

Each R is independently a $C_1$-$C_{20}$-hydrocarbyl, $C_6$-$C_{20}$-aryl, $C_7$-$C_{20}$-arylalkyl or $C_7$-$C_{20}$-alkylaryl. Preferably each $R^8$ are the same or different with $R^8$ being a linear or branched $C_1$-$C_4$-alkyl group, more preferably with $R^8$ being the same and being a $C_1$-$C_2$-alkyl group. Most preferably, all $R^8$ groups are methyl.

In a preferred embodiment, the invention provides a metallocene catalyst complex of formula (Ia)

Formula (Ia)

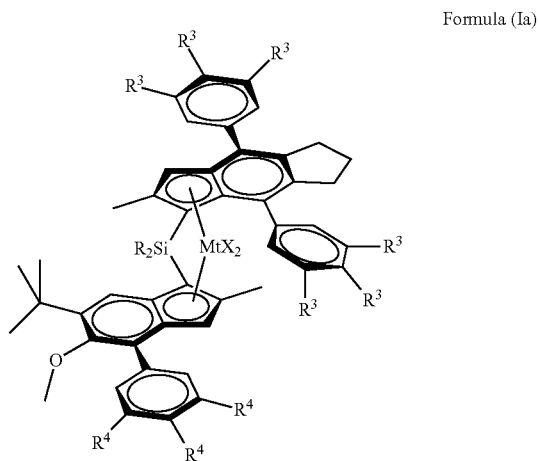

wherein

Mt is Zr or Hf, preferably Zr;

each $R^3$ and $R^4$ are independently the same or can be different and are hydrogen or a linear or branched $C_1$-$C_6$-alkyl group, wherein at least on $R^3$ per phenyl group and at least one $R^4$ is not hydrogen.

Specific metallocene catalyst complexes of the invention include:

rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl] zirconium dichloride (MC-1);

rac-anti-dimethylsilanediyl[2-methyl-4,8-bis-(3',5'-dimethylphenyl)-1,5,6,7-tetrahydro-s indacen-1-yl] [2-methyl-4-(3',5'-dimethylphenyl)-5-methoxy-6-tert-butylinden-1-yl] zirconium dichloride (MC-2);

rac-anti-dimethylsilanediyl[2-methyl-4,8-bis-(3',5'-dimethylphenyl)-1,5,6,7-tetrahydro-s-indacen-1-yl][2-methyl-4-(3',5'-ditert-butyl-phenyl)-5-methoxy-6-tert-butylinden-1-yl]zirconium dichloride (MC-3);

or their corresponding zirconium dimethyl analogues.

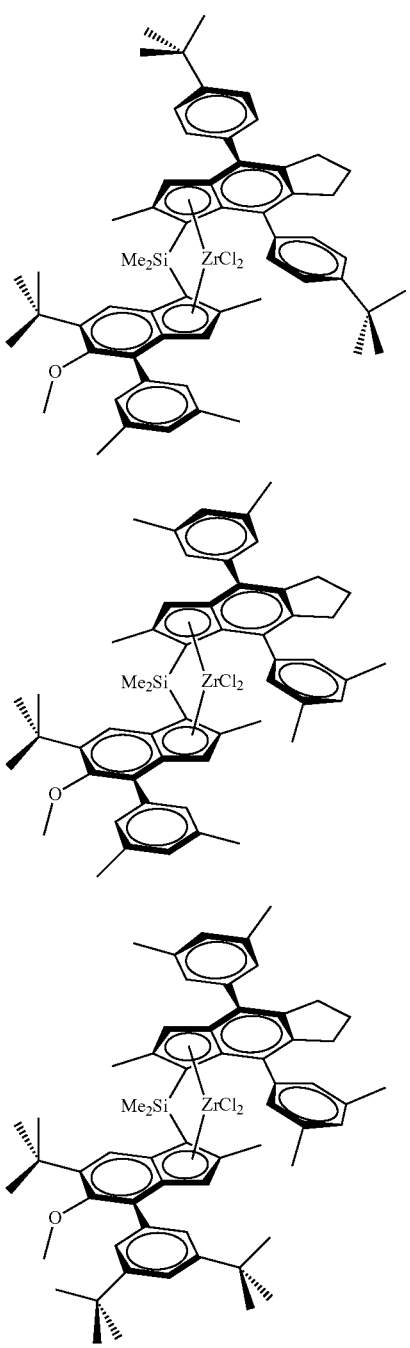

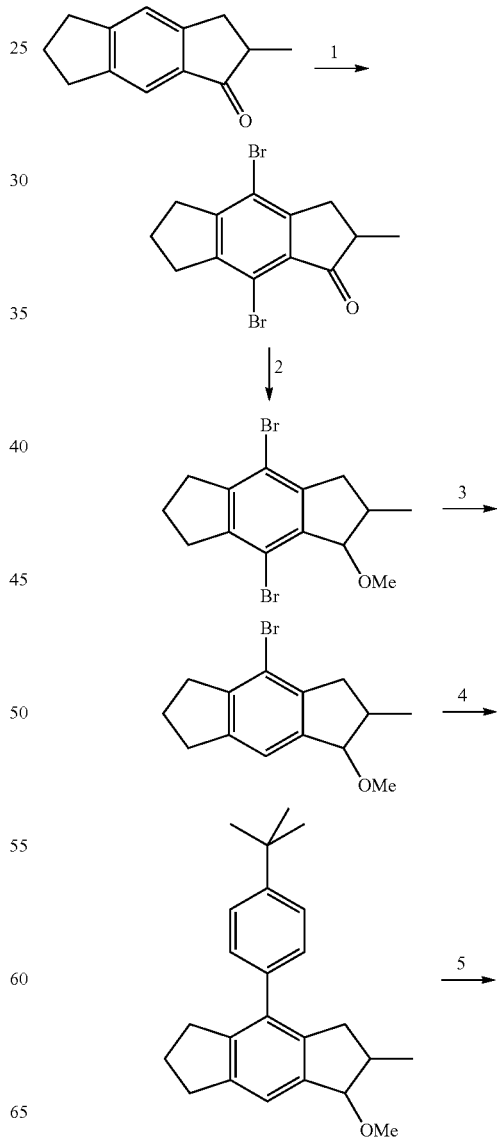

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

Synthesis

The ligands required to form the catalysts of the invention can be synthesised by any process and the skilled organic chemist would be able to devise various synthetic protocols for the manufacture of the necessary ligand materials.

WO2007/116034 discloses the necessary chemistry and is herein incorporated by reference. Synthetic protocols can also generally be found in WO2002/02576, WO2011/135004, WO2012/084961, WO2012/001052, WO2011/076780 and WO2015/158790. The examples section also provides the skilled person with sufficient direction.

Synthesis of the Ligand of the Metallocene Catalyst Complex of Formula (I or Ia) Comprising the Two $(R^3)_3$-Phenyl-Group Substituents, Preferably Indacenyl Ligand Synthesis.

The ligand of the metallocenes as disclosed in WO2018/122134 include two different indenes, one methoxyindene and one indacene. The synthesis of the methoxyindene is simple and gives high yield, while the synthesis of the indacene requires several steps, as shown in scheme 1 for the case of the 4-(4-tert-butylphenyl)indacene:

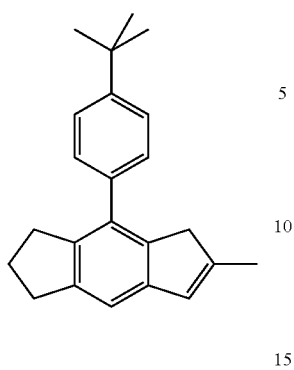

The ligand of the metallocene catalyst complex of formula (I or Ia) comprising the two (R³)₃-phenyl-group substituents, preferably the indacene ligand used in the synthesis of the inventive metallocene catalyst complexes, which is the structural analogue of above structure, is obtained with one step less, as shown in scheme 2:

Scheme 2

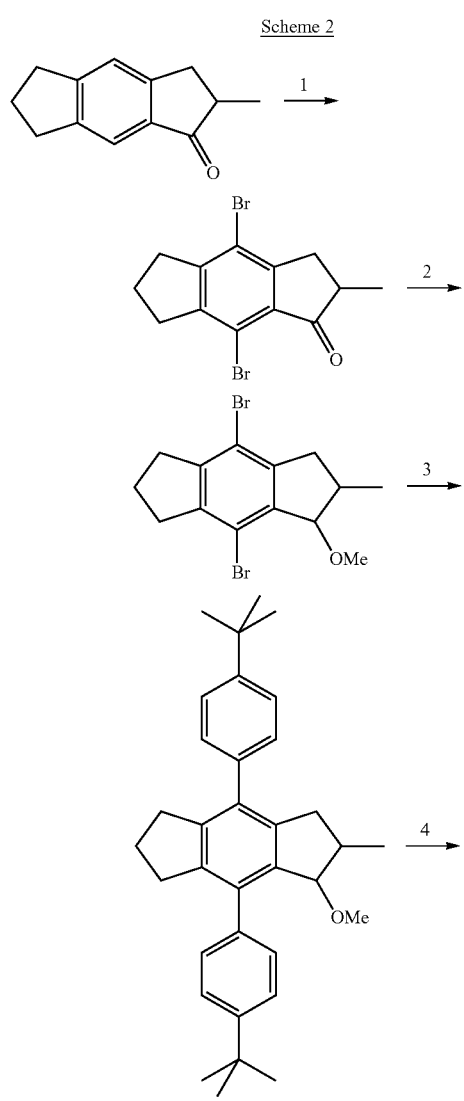

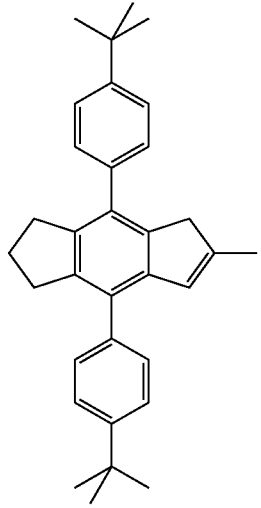

Thus, the new metallocene catalyst complexes of the present invention can be prepared in a simpler way and as is shown in the experimental part in a more efficient way, too.

The present invention is therefore also related to a process for producing the ligand of the metallocene catalyst complex of formula (I or Ia) comprising the two (R³)₃-phenyl-group substituents, preferably the indacene ligand.

This process analogous to scheme 2 comprises the steps
1. Electrophilic dibromination of the starting keton-compound, e.g. R¹-3,5,6,7-tetrahydro-s-indecen-1(2H)-one
2. Reduction of the corresponding dibromo-compound, e.g. 4,8-dibromo-R¹-3,5,6,7-tetrahydro-s-indecen-1 (2H)-one, followed by methylation to yield the corresponding OMe-compound
3. Kumada coupling with (R³)₃-phenylmagnesium bromide and
4. Demethoxylation Thus, a metallocene catalyst complex according to anyone of claim 1 to 6, wherein the ligand of the metallocene catalyst complex of formula (I or Ia) comprising the two (R³)₃-phenyl-group substituents is prepared by a process comprising steps 1) to 4) wherein in step
1) a starting keton-compound, e.g. R¹-3,5,6,7-tetrahydro-s-indecen-1(2H)-one, is dibrominated electrophilically
2) the obtained corresponding dibromo-compound from step 1, e.g. 4,8-dibromo-R¹-3,5,6,7-tetrahydro-s-indecen-1(2H)-one, is reduced and followed by methylation to yield the corresponding OMe-compound
3) the obtained corresponding OMe-compound from step 2 is Kumada coupled with (R³)₃-phenylmagnesium bromide and
4) the compound from step 3 is demethoxylated.

Step 1) is preferably done with aluminium chloride in dichlormethane at low temperature, like 2 to 10° C., e.g. around +5° C.

The reduction in step 2) is preferably done by sodium borohydride in THF-MeOH medium at low temperature, like 2 to 10° C., e.g. around +5° C.

The methylation is preferably performed at room temperature with MeI/KOH/DMSO.

Step 3) is preferably done in the presence of NiCl₂(PPh₃) IPr catalyst at reflux temperature and step 4) is preferably done with a catalytic amount of TsOH in toluene at reflux temperature.

The steps 1) to 4) are analogous to Scheme 2 above.

Cocatalyst

To form an active catalytic species it is normally necessary to employ a cocatalyst as is well known in the art.

According to the present invention a cocatalyst system comprising a boron containing cocatalyst and/or an aluminoxane cocatalyst is used in combination with the above defined metallocene catalyst complex.

The aluminoxane cocatalyst can be one of formula (X):

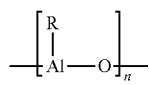

(X)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_{3-10}$ cycloalkyl, $C_7$-$C_{12}$ arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used instead of the aluminoxane cocatalyst or the aluminoxane cocatalyst can be used in combination with a boron containing cocatalyst.

It will be appreciated by the skilled man that where boron based cocatalysts are employed, it is normal to pre-alkylate the complex by reaction thereof with an aluminium alkyl compound, such as TIBA. This procedure is well known and any suitable aluminium alkyl, e.g. $Al(C_{1-6}$-alkyl$)_3$, can be used. Preferred aluminium alkyl compounds are triethylaluminium, tri-isobutylaluminium, tri-isohexylaluminium, tri-n-octylaluminium and tri-isooctylaluminium.

Alternatively, when a borate cocatalyst is used, the metallocene catalyst complex is in its alkylated version, that is for example a dimethyl or dibenzyl metallocene catalyst complex can be used.

Boron based cocatalysts of interest include those of formula (Z)

$$BY_3 \quad (Z)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5- difluorophenyl, pentachlorophenyl, pentafluorophenyl, 3,4,5-trifluorophenyl and 3,5- di(trifluoromethyl)phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl)borane and/or tris (3,4,5-trifluorophenyl)borane.

Particular preference is given to tris(pentafluorophenyl) borane.

However it is preferred that borates are used, i.e. compounds containing a borate 3+ ion. Such ionic cocatalysts preferably contain a non-coordinating anion such as tetrakis (pentafluorophenyl)borate and tetraphenyborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N, N-dimethylanilinium.

Preferred ionic compounds which can be used according to the present invention include:
triethylammoniumtetra(phenyl)borate,
tributylammoniumtetra(phenyl)borate,
trimethylammoniumtetra(tolyl)borate,
trbutylammoniumtetra(tolyl)borate,
tributylammoniumtetra(pentafluorophenyl)borate,
tripropylammoniumtetra(dimethylphenyl)borate,
trbutylammoniumtetra(trifluoromethylphenyl)borate,
trbutylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl) borate,
N,N-dimethylaniliniumtetra(phenyl)borate,
N,N-diethylaniliniumtetra(phenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethybenzylammoniumtetrakis(pentafluoropheny)borate.

It has been surprisingly found that certain boron cocatalysts are especially preferred. Preferred borates of use in the invention therefore comprise the trityl ion. Thus the use of N,N-dimethylammonium-tetrakispentafluorophenylborate and $Ph_3CB(PhF_5)_4$ and analogues therefore are especially favoured.

According to the present invention, the preferred cocatalysts are alumoxanes, more preferably methylalumoxanes, combinations of alumoxanes with Al-alkyls, boron or borate cocatalysts and combinations of alumoxanes with boron-based cocatalysts.

According to the most preferred embodiment of present invention, the preferred cocatalysts are alumoxanes, most preferably methylalumoxanes.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

Catalyst Manufacture

The metallocene catalyst complex of the present invention can be used in combination with a suitable cocatalyst as a catalyst for the polymerization of propylene, e.g. in a solvent such as toluene or an aliphatic hydrocarbon, (i.e. for polymerization in solution), as it is well known in the art. Preferably, polymerization of propylene takes place in the condensed phase or in gas phase.

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/14856, WO95/12622 and WO2006/097497. The particle size is not critical but is preferably in the range 5 to 200 µm, more preferably 20 to 80 µm. The use of these supports is routine in the art.

In an alternative embodiment, no support is used at all. Such a catalyst can be prepared in solution, for example in an aromatic solvent like toluene, by contacting the metallocene (as a solid or as a solution) with the cocatalyst, for example methylaluminoxane or a borane or a borate salt previously dissolved in an aromatic solvent, or can be prepared by sequentially adding the dissolved catalyst components to the polymerization medium.

In one embodiment, no external carrier is used but the catalyst is still presented in solid particulate form. Thus, no external support material, such as inert organic or inorganic carrier, for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution, which is dispersed to the immiscible solvent, or, alternatively, at least two separate catalyst solutions for each part of the catalyst forming compounds may be prepared, which are then dispersed successively to the solvent.

Full disclosure of the necessary process can be found in WO03/051934, which is herein incorporated by reference.

The invention is also industrially advantageous, since it enables the preparation of the solid particles to be carried out as a one-pot procedure. Continuous or semi-continuous processes are also possible for producing the catalyst.

Catalyst Off-Line Prepolymerization

The use of the heterogeneous catalysts, where no external support material is used (also called "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is possible to "off line prepolymerize" the catalyst before using it in polymerization process.

It has to be noted that off line prepolymerization in this regard is part of the catalyst preparation process, being a step carried out after a solid catalyst is formed. The catalyst off line prepolymerization step is not part of the actual polymerization process configuration comprising a prepolymerization step. After the catalyst off line prepolymerization step, the solid catalyst can be used in polymerization.

Catalyst "off line prepolymerization" takes place following the solidification step of the liquid-liquid emulsion process. Pre-polymerization may take place by known methods described in the art, such as that described in WO 2010/052263, WO 2010/052260 or WO 2010/052264.

Preferable embodiments of this aspect of the invention are described herein.

As monomers in the catalyst off-line prepolymerization step preferably alpha-olefins are used.

Preferable C2-C10 olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene, especially propylene.

The catalyst off-line prepolymerization may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0 to 140° C., preferably 30 to 120° C., like 50 to 110° C.

Where the catalyst off line prepolymerization is done in fluorinated hydrocarbons, the temperature for the pre-polymerization step is below 70° C., e.g. in the range of −30 to 70° C., preferably 0-65° C. and more preferably in the range 20 to 55° C. Pressure within the reaction vessel is preferably higher than atmospheric pressure to minimize the eventual leaching of air and/or moisture into the catalyst vessel. Preferably the pressure is in the range of at least 1 to 15 bar, preferably 2 to 10 bar. The reaction vessel is preferably kept in an inert atmosphere, such as under nitrogen or argon or similar atmosphere.

Off line prepolymerization is continued until the desired pre-polymerization degree, defined as weight of polymer matrix/weight of solid catalyst before pre-polymerization step, is reached.

The degree is below 25, preferably 0.5 to 10.0, more preferably 1.0 to 8.0, most preferably 2.0 to 6,0.

Use of the off-line catalyst prepolymerization step offers the advantage of minimising leaching of catalyst components and thus local overheating.

After off line prepolymerization, the catalyst can be isolated and stored.

Polymerization

The catalysts according to the invention are suited to the formation of propylene homopolymers, propylene-ethylene copolymers or propylene-$C_{4-10}$ alpha olefin copolymers. Thus, the process comprises polymerizing propylene, propylene and ethylene, or propylene and a $C_{4-10}$ alpha olefin. The ethylene content in such a propylene-ethylene polymer may vary depending on the desired properties of the polymer. Typically, ethylene content will range from 0.1 to 10 mol %. Especially, the catalysts of the present invention are used to manufacture propylene homopolymers or propylene copolymers with ethylene as comonomer and propylene copolymers with hexene as a comonomer.

Polymerization in the method of the invention may be effected in one or more, e.g. 1, 2 or 3, polymerization reactors, using conventional polymerization techniques, e.g. gas phase, solution phase, slurry or bulk polymerization or combinations thereof, like a combination of a slurry and at least one gas phase reactor.

In case of propylene polymerization for slurry reactors, the reaction temperature will generally be in the range 60 to 110° C. (e.g. 60-90° C.), the reactor pressure will generally be in the range 5 to 80 bar (e.g. 20-60 bar), and the residence time will generally be in the range 0.1 to 5 hours (e.g. 0.3 to 2 hours). The monomer is usually used as reaction medium.

For gas phase reactors, the reaction temperature used will generally be in the range 60 to 115° C. (e.g. 70 to 110° C.), the reactor pressure will generally be in the range 10 to 25 bar, and the residence time will generally be 0,5 to 8 hours (e.g. 0.5 to 4 hours). The gas used will be the monomer optionally as mixture with a non-reactive gas such as nitrogen or propane. In addition to actual polymerization steps and reactors, the process can contain any additional polymerization steps, like prepolymerization step, and any further after reactor handling steps as known in the art.

For solution polymerization, an aliphatic or aromatic solvent can be used to dissolve the monomer and the polymer, and the polymerization temperature will generally be in the range 80 to 200° C. (e.g. 90 to 150° C.)

Generally the quantity of catalyst used will depend upon the nature of the catalyst, the reactor types and conditions and the properties desired for the polymer product. As is well known in the art hydrogen can be used for controlling the molecular weight of the polymer.

The metallocene catalysts of the invention possess excellent catalyst activity and good comonomer response. The catalysts are also able to provide polymers of high weight average molecular weight Mw.

Moreover, the random copolymerization behaviour of metallocene catalysts of the invention shows a reduced tendency of chain transfer to ethylene. Polymers obtained with the metallocenes of the invention have normal particle morphologies.

Polymers

It is a feature of the invention that the claimed catalysts enable the formation of polymers with high molecular weight. These features can be achieved at commercially interesting polymerization temperatures, e.g. 60° C. or more. It is a preferred feature of the invention that the catalysts of the invention are used to polymerize propylene at a temperature of at least 60° C., preferably at least 65° C., such as at least 70° C. In a particular embodiment, the propylene polymers obtained using the catalysts of the invention have a polydispersity index (Mw/Mn) of 2.0 or greater, such as 2.2-6.5.

Propylene Homopolymers

Propylene homopolymers made by the metallocenes of the invention can be made with Mw (weight average molecular weight) values in the range of 40 to 2 000 kg/mol, preferably in the range of 50 to 1 500 kg/mol depending on the use and amount of hydrogen used as Mw regulating agent. The catalysts of the invention enable the formation of polypropylene homopolymers with high melting points. In a preferred embodiment the propylene homopolymer formed by the process of the invention has a melting point of more than 149.0° C., preferably more than 149.5° C., especially more than 150.0° C.

Propylene Copolymers

Propylene copolymers with ethylene or with C4-C10, especially with C6 comonomers made by the metallocenes of the invention can be made with high productivity. Further, increase in intrinsic viscosity can be seen in propylene-hexene copolymers.

The invention will now be illustrated by reference to the following non-limiting examples.

Analytical Tests

Measurement Methods:

Al and Zr determination (ICP-method) (examples IE1, CE1) The elementary analysis of a catalyst was performed by taking a solid sample of mass, M, cooling over dry ice. Samples were diluted up to a known volume, V, by dissolving in nitric acid (HNO3, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental iCAP 6300 Inductively Coupled Plasma-Optical Emission Spectrometer (ICP-OES) which was calibrated using a blank (a solution of 5% HNO3, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% HNO3, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% HNO3, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Ai concentration in ICP sample was between 0-10 ppm (calibrated only to 100 ppm) and via the 396.152 nm line for Ai concentrations above 10 ppm.

The reported values are an average of three successive aliquots taken from the same sample and are related back to the original catalyst by inputting the original mass of sample and the dilution volume into the software.

In the case of analysing the elemental composition of prepolymerized catalysts, the polymeric portion is digested by ashing in such a way that the elements can be freely dissolved by the acids. The total content is calculated to correspond to the weight % for the prepolymerized catalyst.

Al and Zr Determination (ICP-Method) (Examples IE2, CE2 and CE3)

In a glovebox, an aliquot of the catalyst (ca. 40 mg) was weighted into glass weighting boat using analytical balance. The sample was then allowed to be exposed to air overnight while being placed in a steel secondary container equipped with an air intake. Then 5 mL of concentrated (65%) nitric acid was used to rinse the content of the boat into the Xpress microwave oven vessel (20 mL). A sample was then subjected to a microwave-assisted digestion using MARS 6 laboratory microwave unit over 35 minutes at 150° C. The digested sample was allowed to cool down for at least 4 h and then was transferred into a glass volumetric glass flask of 100 mL volume. Standard solutions containing 1000 mg/L Y and Rh (0.4 mL) were added. The flask was then filled up with distilled water and shaken well. The solution was filtered through 0.45 μm Nylon syringe filters and then subjected to analysis using Thermo iCAP 6300 ICP-OES and iTEVA software.

The instrument was calibrated for Ai, B, Hf, Mg, Ti and Zr using a blank (a solution of 5% HNO3) and six standards of 0.005 mg/L, 0.01 mg/L, 0.1 mg/L, 1 mg/L, 10 mg/L and 100 mg/L of Ai, B, Hf, Mg, Ti and Zr in solutions of 5% HNO3 distilled water. However, not every calibration point was used for each wavelength. Each calibration solution contained 4 mg/L of Y and Rh standards. Ai 394.401 nm was calibrated using the following calibration points: blank, 0.1 mg/L, 1 mg/L, 10 mg/L and 100 mg/L. Al 167.079 nm was calibrated as Ai 394.401 nm excluding 100 mg/L and Zr 339.198 nm using the standards of blank, 0.01 mg/L, 0.1 mg/L, 1 mg/L, 10 mg/L and 100 mg/L. Curvilinear fitting and 1/concentration weighting was used for the calibration curves.

Immediately before analysis the calibration was verified and adjusted (instrument reslope function) using the blank and a 10 mg/L Al, B, Hf, Mg, Ti and Zr standard which had 4 mg/L Y and Rh. A quality control sample (QC: 1 mg/L Al, Au, Be, Hg & Se; 2 mg/L Hf & Zr, 2.5 mg/L As, B, Cd, Co, Cr, Mo, Ni, P, Sb, Sn & V; 4 mg/L Rh & Y; 5 mg/L Ca, K, Mg, Mn, Na & Ti; 10 mg/L Cu, Pb and Zn; 25 mg/L Fe and 37.5 mg/L Ca in a solution of 5% HNO3 in distilled water) was run to confirm the reslope for Ai, B, Hf, Mg, Ti and Zr. The QC sample was also run at the end of a scheduled analysis set.

The content for Zr was monitored using Zr 339.198 nm {99} line. The content of aluminium was monitored via the 167.079 nm {502} line, when Al concentration in test portion was under 2 wt % and via the 394.401 nm {85} line for Al concentrations above 2 wt-%. Y 371.030 nm {91} was used as internal standard for Zr 339.198 nm and Ai 394.401 nm and Y 224.306 nm {450} for Al 167.079 nm.

The reported values were back calculated to the original catalyst sample using the original mass of the catalyst aliquot and the dilution volume.

GPC: Molecular Weight Averages, Molecular Weight Distribution, and Polydispersity Index (Mn, Mw, Mw/Mn)

Molecular weight averages (Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1: 2003, ISO 16014-2:2003, ISO 16014-4:2003 and ASTM D 6474-12.

A high temperature GPC instrument, equipped with either infrared (IR) detector (IR4 or IR5 from PolymerChar (Valencia, Spain) or differential refractometer (RI) from Agilent Technologies, equipped with 3x Agilent-PLgel Olexis and 1x Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\alpha_{PS}=0.655$ $K_{PE}=39\times10^{-3}$ mL/g, $\alpha_{PE}=0.725$ $K_{PP}=19\times10^{-3}$ mL/g, $\alpha_{PP}=0.725$ A third order polynomial fit was used to fit the calibration data.

All samples were prepared in the concentration range of 0.5-1 mg/ml and dissolved at 160° C. for 2.5 hours for PP or 3 hour.

DSC Analysis

Melting temperature $T_m$ was measured on approx. 5 mg samples with a Mettler-Toledo 822e differential scanning calorimeter (DSC), according to ISO11357-3 in a heat/cool/heat cycle with a scan rate of 10° C./min in the temperature range of +23 to +225° C. under a nitrogen flow rate of 50 ml min$^{-1}$. Melting temperature was taken as the endotherm peak, respectively in the second heating step. Calibration of the instrument was performed with $H_2O$, Lead, Tin, Indium, according to ISO 11357-1.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. and may be determined at different loadings such as 2.16 kg (MFR$_2$) or 21.6 kg (MFR$_{21}$).

Polymer Powder Bulk Density

Instruments:

Electronic balance: Range from 0.1 g-11000 g

Graduated glass cylinder: Volume=max·250 ml

Plastic spoon: Volume=125 ml

Plastic funnel: D=105 mm

Execution: A glass cylinder is filled up to the max. volume of 250 ml by pouring in the unstabilized polymer powder, using a plastic spoon and a plastic funnel.

Calculation: Mass of polymer (g)/measured volume (ml)

FT-IR

The content of 1-hexene has been measured by FT-IR spectroscopy according to a based on prior calibration using 13C NMR spectroscopy. Calibration was facilitated through the use of a set of in-house non-commercial reference materials of known hexene contents determined by quantitative $^{13}C$ melt state NMR spectroscopy. The calibration procedure was undertaken in the conventional manner. The calibration set consisted of eight reference materials with 1-hexene contents ranging 0.8-6.3 wt % produced at pilot scale under a variety of conditions and characterised by $^{13}$C melt state NMR spectroscopy. The calibration set was selected to reflect the typical variety of copolymers encountered by the final quantitative IR spectroscopy method. Quantitative IR spectra were recorded in the solid-state using a Bruker Vertex 70 FTIR spectrometer. Spectra were recorded on 25×25 mm square films of 300 um thickness prepared by compression moulding at 180-210° C. and 4-6 mPa. Standard transmission FTIR spectroscopy was employed using a spectral range of 5000-500 cm-1, an aperture of 6 mm, a spectral resolution of 2 cm-1, 16 background scans, 16 spectrum scans, an interferogram zero filling factor of 64 and Blackmann-Harris 3-term apodisation. Quantitative analysis was undertaken using the total area of the CH$_2$ rocking deformations at around 727 cm$^{-1}$ (AQ) corresponding to (CH$_2$)$_3$ structural units in butyl branches (integration method B, limits 750 and 715 cm-1). The quantitative band was normalised to the area of the CH band at 4323 cm$^{-1}$ (AR) corresponding to CH structural units (integration method B, limits 4450, 4007 cm$^{-1}$). The hexene content in units of weight percent was then predicted from the normalised absorption (AQ/AR) using a quadratic calibration curve. The calibration curve having previously been constructed by ordinary least squares (OLS) regression of the normalised absorptions and primary comonomer contents measured on the calibration set.

Description: Poly(Propylene-Co-Hexene)—Hexene Content—$^{13}$C NMR Spectroscopy

Quantitative $^{13}$C{$^1$H} NMR spectra recorded in the molten-state using a Bruker Avance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the NOE at short recycle delays of 3s (Klimke, K., Parkinson, M., Piel, C., Kaminsky, W., Spiess, H. W., Wilhelm, M., Macromol. Chem. Phys. 2006; 207: 382., Pollard, M., Klimke, K., Graf, R., Spiess, H. W., Wilhelm, M., Sperber, O., Piel, C., Kaminsky, W., Macromolecules 2004; 37:813) and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, S1, S198). A total of 16384 (16k) transients were acquired per spectra. Quantitative $^{13}$C{$^1$H} NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$H=I\alpha B4/2$

The amount of 1-hexene incorporated in PHHP double consecutive sequences was quantified using the integral of the αβB4 site at 41.7 ppm accounting for the number of reporting sites per comonomer:

$HH=2*I\alpha\alpha B4$

When double consecutive incorporation was observed the amount of 1-hexene incorporated in PHP isolated sequences needed to be compensated due to the overlap of the signals αB4 and αB4B4 at 44.4 ppm:

$H=(I\alpha B4-2*I\alpha\alpha B4)/2$

The total 1-hexene content was calculated based on the sum of isolated and consecutively incorporated 1-hexene:

$H\text{total}=H+HH$

When no sites indicative of consecutive incorporation observed the total 1-hexeen comonomer content was calculated solely on this quantity:

$H\text{total}=H$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$P21=I\alpha\alpha 21e9$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$P12=I_S\alpha\alpha+2*P21+H+HH/2$

The total amount of propene was quantified as the sum of primary (1,2) and secondary (2,1-erythro) inserted propene:

$P\text{total}=P12+P21=I_S\alpha\alpha+3*I\alpha\alpha 21e9+(I\alpha B4-2*I\alpha\alpha B4)/2+I\alpha\alpha B4$ This simplifies to:

$P\text{total}=I_S\alpha\alpha+3*I\alpha\alpha 21e9+0.5*I\alpha B4$

The total mole fraction of 1-hexene in the polymer was then calculated as:

$fH=H\text{total}/(H\text{total}+P\text{total})$

The full integral equation for the mole fraction of 1-hexene in the polymer was:

$fH=(((I\alpha B4-2*I\alpha\alpha B4)/2)+(2*I\alpha\alpha B4))/((I_S\alpha\alpha+3*I\alpha\alpha 21e9+0.5*I\alpha B4)+((I\alpha B4-2*I\alpha\alpha B4)/2)+(2*I\alpha\alpha B4))$ This simplifies to:

$fH=(I\alpha B4/2+I\alpha\alpha B4)/(I_S\alpha\alpha+3*I\alpha\alpha 21e9+I\alpha B4+I\alpha\alpha B4)$ The total comonomer incorporation of 1-hexene in mole percent was calculated from the mole fraction in the usual manner:

$H\ [\text{mol }\%]=100*fH$

The total comonomer incorporation of 1-hexene in weight percent was calculated from the mole fraction in the standard manner:

$$H [\text{wt \%}] = 100*(fH*84.16)/((fH*84.16)+((1-fH)*42.08))$$

Crystex

Crystalline and Soluble Fractions and their Respective Properties

The crystalline (CF) and soluble fractions (SF) of the polypropylene (PP) compositions as well as the comonomer content and intrinsic viscosities of the respective fractions were analyzed by the CRYSTEX QC Polymer Char (Valencia, Spain).

A schematic representation of the CRYSTEX QC instrument is presented in Del Hierro, P.; Ortin, A.; Monrabal, B.; 'Soluble Fraction Analysis in polypropylene, The Column, February 2014. Pages 18-23. The crystalline and amorphous fractions are separated through temperature cycles of dissolution at 160° C., crystallization at 40° C. and re-dissolution in 1,2,4-trichlorobenzene (1,2,4-TCB) at 160° C. Quantification of SF and CF and determination of ethylene content (C2) are achieved by means of an infrared detector (IR4) and an online 2-capillary viscometer is used for determination of the intrinsic viscosity (IV).

IR4 detector is multiple wavelength detector detecting IR absorbance at two different bands (CH3 and CH2) for the determination of the concentration determination and the Ethylene content in Ethylene-Propylene copolymers. IR4 detector is calibrated with series of EP copolymers with known Ethylene content in the range of 2 wt.-% to 69 wt.-% (determined by 13C-NMR).

Amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 Wt %.

Intrinsic viscosity (IV) of the parent EP copolymer and its soluble and crystalline fractions are determined with a use of an online 2-capillary viscometer and are correlated to corresponding IV's determined in decalin according to ISO 1628.

Calibration is achieved with several commercial EP PP copolymers with IV=2-4 dL/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

A defined volume of the sample solution is injected into the column filled with inert support where the crystallization of the sample and separation of the soluble fraction from the crystalline part is taking place. This process is repeated two times. During the first injection the whole sample is measured at high temperature, determining the IV[dl/g] and the C2[wt %] of the PP composition. During the second injection the soluble fraction (at low temperature) and the crystalline fraction (at high temperature) with the crystallization cycle are determined (Wt % SF, Wt % C2, IV).

EXAMPLES

Metallocene Synthesis

Chemicals Used for Complex Preparation:

2,6-Dimethylaniline (Acros), 1-bromo-3,5-dimethybenzene (Acros), 1-bromo-3,5-di-tert-butybenzene (Acros), bis(2,6-diisopropylphenyl)imidazolium chloride (Aldrich), triphenylphosphine (Acros), NiCl2(DME) (Aldrich), dichlorodimethylsilane (Merck), ZrCl4 (Merck), trimethylborate (Acros), Pd(OAc)2 (Aldrich), NaBH4 (Acros), 2.5 M nBuLi in hexanes (Chemetal), CuCN (Merck), magnesium turnings (Acros), silica gel 60, 40-63 μm (Merck), bromine (Merck), 96% sulfuric acid (Reachim), sodium nitrite (Merck), copper powder (Alfa), potassium hydroxide (Merck), K2CO3 (Merck), 12 M HCl (Reachim), TsOH (Aldrich), MgSO4 (Merck), Na2CO3 (Merck), Na2SO4 (Akzo Nobel), methanol (Merck), diethyl ether (Merck), 1,2-dimethoxyethane (DME, Aldrich), 95% ethanol (Merck), dichloromethane (Merck), hexane (Merck), THF (Merck), and toluene (Merck) were used as received. Hexane, toluene and dichloromethane for organometallic synthesis were dried over molecular sieves 4A (Merck). Diethyl ether, THF, and 1,2-dimethoxyethane for organometallic synthesis were distilled over sodium benzophenoneketyl. CDCl3 (Deutero GmbH) and CD2Cl2 (Deutero GmbH) were dried over molecular sieves 4A.

4-Bromo-6-tert-butyl-5-methoxy-2-methylindan-1-one was obtained as described in WO2013/007650.

4,8-dibromo-1-methoxy-2-methyl-1,2,3,5,6,7-hexahydro-s-indacene and 5-tert-butyl-7-(3,5-di-tert-butylphenyl)-6-methoxy-2-methyl-1H-indene were obtained as described in WO2015/158790.

Synthesis of MC-1

4,8-Di(4-tert-butylphenyl)-1-methoxy-2-methyl-1,2,3,5,6,7-hexahydro-s-indacene

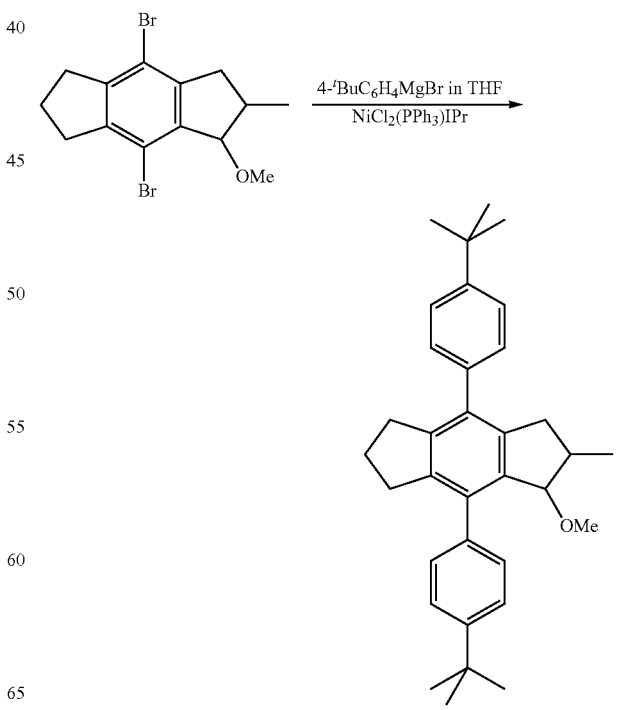

To a mixture of 4.3 g (5.51 mmol) of NiCl$_2$(PPh$_3$)IPr and 76.06 g (211.2 mmol) of 4,8-dibromo-1-methoxy-2-methyl-1,2,3,5,6,7-hexahydro-s-indacene[1] 550 ml (550 mmol, 1.3 equiv) of 1.0 M 4-tert-butylphenylmagnesium bromide in THF was added at a such rate to maintain a gentle reflux. The resulting solution was refluxed for 3 h, then cooled to room temperature, and 1000 ml of water followed by 500 ml of 1.0 M HCl and 400 ml of ether were added. The organic layer was separated and then evaporated to dryness to give a red oil. The product was isolated by flash-chromatography on silica gel 60 (40-63 µm; eluent: hexane-dichloromethane=5:1, vol., then 2:1, vol.). This procedure gave 91.5 g (93%) of a mixture of two diastereoisomers of 4,8-di(4-tert-butylphenyl)-1-methoxy-2-methyl-1,2,3,5,6,7-hexahydro-s-indacene as a white solid mass.

[1] In this case, 4,8-dibromo-1-methoxy-2-methyl-1,2,3,5,6,7-hexahydro-s-indacene contaminated with ~15% of its angular isomer, i.e. 4,5-dibromo-3-methoxy-2-methyl-1,2,3,6,7,8-hexahydro-as-indacene was used $^1$H NMR (CDCl$_3$), mixture of isomers: δ 7.46-7.38 (m, 5H), 7.37-7.32 (m, 1H), 7.32-7.27 (m, 2H), 4.38 (d, J=5.1 Hz) and 4.15 (s) {sum 1H}, 3.40-3.32 (m, 0.5H), 3.17 (s) and 3.07 (s) {sum 3H}, 2.99-2.65 (m, 5H), 2.56-2.48 (m, 0.5H), 2.43-2.34 (m, 0.5H), 2.31-2.22 (m, 0.5H), 2.06-1.94 (m, 1H), 1.94-1.82 (m, 1H), 1.38(s), 1.37 (2s) and 1.36 (s) {sum 18H}, 1.16 (d, J=6.9 Hz) and 0.90 (d, J=7.2 Hz) {sum 3H}. $^{13}$C{$^1$H} NMR (CDCl$_3$), mixture of isomers: δ 149.48, 149.32, 149.28, 149.26, 143.88, 143.29, 141.93, 141.61, 141.57, 140.93, 140.76, 138.51, 137.01, 136.92, 136.78, 135.67, 135.00, 134.30, 133.75, 129.02, 128.64, 124.80, 124.69, 124.56, 90.17, 85.03, 57.85, 56.09, 40.77, 38.39, 38.03, 37.40, 34.52, 33.09, 32.98, 32.95, 32.68, 31.43, 31.41, 26.29, 26.08, 19.25, 14.18.

4,8-Di(4-tert-butylphenyl)-6-methyl-1,2,3,5-tetrahydro-s-indacene

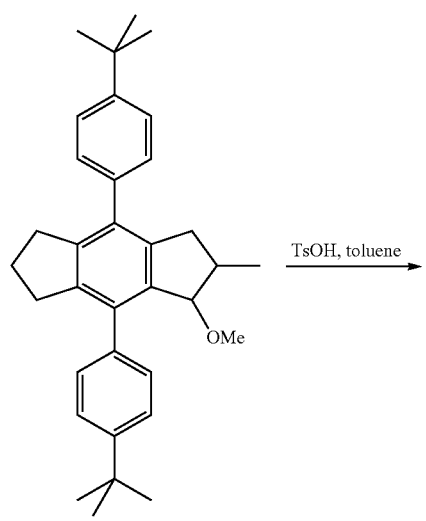

TsOH, toluene

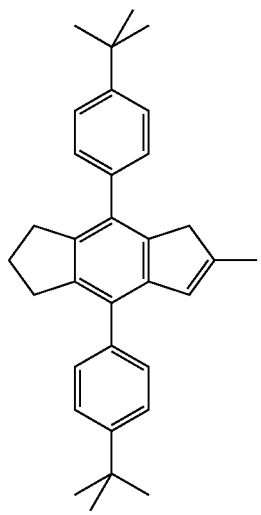

600 mg of TsOH was added to a solution of 91.5 g (196.06 mmol) of 4,8-di(4-tert-butylphenyl)-1-methoxy-2-methyl-1,2,3,5,6,7-hexahydro-s-indacene in 700 ml of toluene, and the resulting mixture was refluxed using Dean-Stark head for 10 min. After cooling to room temperature the reaction mixture was washed with 200 ml of 10% K$_2$CO$_3$. The organic layer was separated, and the aqueous layer was additionally extracted with 200 ml of dichloromethane. The combined organic extract was dried over anhydrous K$_2$CO$_3$, passed through a short pad of silica gel 60 (40-63 µm), and then evaporated to dryness to give a yellowish solid mass. This mass was triturated with warm n-hexane, the formed suspension was filtered off (G3), thus obtained precipitate was washed with n-hexane and dried in vacuum. This procedure gave 61.06 g (72%) of 4,8-di(4-tert-butylphenyl)-6-methyl-1,2,3,5-tetrahydro-s-indacene as a white powder.

$^1$H NMR (CDCl$_3$): δ 7.46-7.42 (m, 4H), 7.38-7.35 (m, 4H), 6.49 (m, 1H), 3.27 (s, 2H), 2.92 (t, J=7.2 Hz, 2H), 2.86 (t, J=7.2 Hz, 2H), 2.04 (s, 3H), 1.98 (quint, J=7.2 Hz, 2H), 1.38 (two s, sum 18H). $^{13}$C{$^1$H} NMR (CDCl$_3$): δ 149.39, 149.19, 145.45, 143.01, 141.12, 140.63, 138.67, 137.14, 136.77, 133.13, 129.35, 129.15, 128.47, 126.40, 125.00, 124.86, 42.59, 34.56, 32.89, 32.66, 31.44, 31.43, 26.27, 16.83.

[4,8-Di(4-tert-butylphenyl)-2-methyl-1,5,6,7-tetrahydro-s-indacen-1-yl] chloro-dimethyl-silane

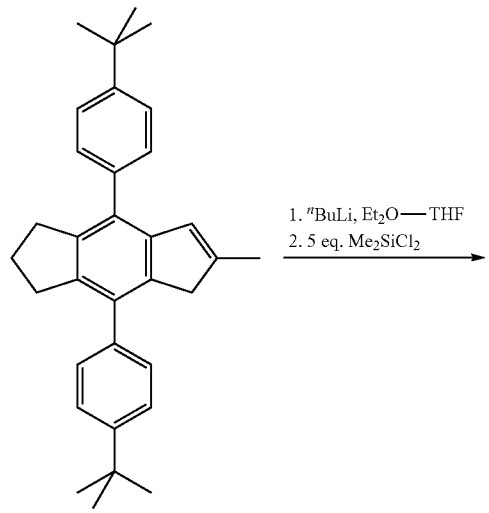

1. $^n$BuLi, Et$_2$O—THF
2. 5 eq. Me$_2$SiCl$_2$

To a cooled to −50° C. solution of 10.87 g (25.01 mmol) of 4,8-di(4-tert-butylphenyl)-6-methyl-1,2,3,5-tetrahydro-s-indacene in a mixture of 200 ml of ether and 40 ml of THF 10.3 ml (25.03 mmol) of 2.43 M $^n$BuLi in hexanes was added in one portion. The resulting mixture was stirred overnight at room temperature, then the obtained yellow suspension was cooled to −30° C., and 16.1 g (124.8 mmol, 5 eqv.) of dichlorodimethylsilane was added in one portion. The resulting mixture was stirred overnight at room temperature, then filtered through a glass frit (G3), and the filter cake was washed with 2×50 ml of toluene. The combined filtrate was evaporated to dryness to give the title product as a slightly yellowish oil which was further used without an additional purification.

$^1$H NMR (CDCl$_3$): δ 7.49-7.40 (m, 6H), 7.38-7.32 (m, 2H), 6.58 (s, 1H), 4.13 (s, 1H), 3.29-3.17 (m, 1H), 3.00-2.81 (m, 2H), 2.70-2.59 (m, 1H), 2.24 (s, 3H), 2.13-2.01 (m, 1H), 1.94-1.79 (m, 1H), 1.39 (s, 9H), 1.38 (s, 9H), −0.22 (s, 3H), −0.23 (s, 3H). $^{13}$C{$^1$H} NMR (CDCl$_3$): δ 150.04, 149.27, 146.26, 143.29, 140.95, 140.05, 138.54, 137.44, 136.98, 132.28, 129.65, 129.57, 129.16, 126.42, 125.11, 124.90, 49.63, 34.59, 34.57, 33.41, 32.88, 31.46, 31.39, 26.31, 18.13, 3.71, −1.58.

2-methyl-4-(3,5-dimethylphenyl)-5-methoxy-6-tert-buty-indan-1-one

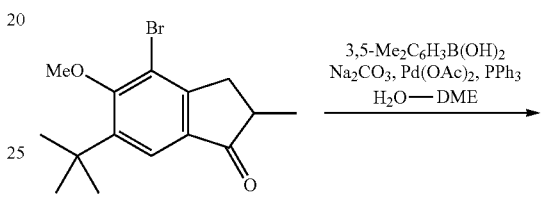

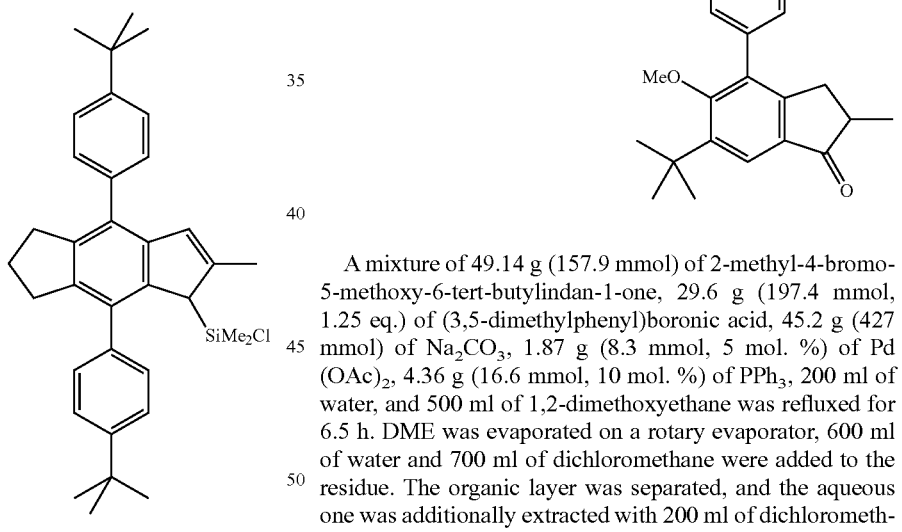

A mixture of 49.14 g (157.9 mmol) of 2-methyl-4-bromo-5-methoxy-6-tert-butylindan-1-one, 29.6 g (197.4 mmol, 1.25 eq.) of (3,5-dimethylphenyl)boronic acid, 45.2 g (427 mmol) of Na$_2$CO$_3$, 1.87 g (8.3 mmol, 5 mol. %) of Pd(OAc)$_2$, 4.36 g (16.6 mmol, 10 mol. %) of PPh$_3$, 200 ml of water, and 500 ml of 1,2-dimethoxyethane was refluxed for 6.5 h. DME was evaporated on a rotary evaporator, 600 ml of water and 700 ml of dichloromethane were added to the residue. The organic layer was separated, and the aqueous one was additionally extracted with 200 ml of dichloromethane. The combined extract was dried over K$_2$CO$_3$ and then evaporated to dryness to give a black oil. The crude product was purified by flash chromatography on silica gel 60 (40-63 μm, hexane-dichloromethane=1:1, vol., then, 1:3, vol.) to give 48.43 g (91%) of 2-methyl-4-(3,5-dimethylphenyl)-5-methoxy-6-tert-butylindan-1-one as a brownish oil.

Anal. calc. for C$_{23}$H$_{28}$O$_2$: C, 82.10; H, 8.39. Found: C, 82.39; H, 8.52.

$^1$H NMR (CDCl$_3$): δ 7.73 (s, 1H), 7.02 (s, 3H), 7.01 (s, 3H), 3.32 (s, 3H), 3.13 (dd, J=17.5 Hz, J=7.8 Hz, 1H), 2.68-2.57 (m, 1H), 2.44 (dd, J=17.5 Hz, J=3.9 Hz, 1H), 2.36 (s, 6H), 1.42 (s, 9H), 1.25 (d, J=7.5 Hz, 3H). $^{13}$C{$^1$H} NMR (CDCl$_3$): δ 208.90, 163.50, 152.90, 143.32, 138.08, 136.26, 132.68, 130.84, 129.08, 127.18, 121.30, 60.52, 42.17, 35.37, 34.34, 30.52, 21.38, 16.40.

2-methyl-5-tert-butyl-6-methoxy-7-(3,5-dimethylphenyl)-1H-indene

[4,8-Di(4-tert-butylphenyl)-2-methyl-1,5,6,7-tetrahydro-s-indacen-1-yl][6-tert-butyl-4-(3,5-dimethylphenyl)-5-methoxy-2-methyl-1H-inden-1-yl]dimethylsilane

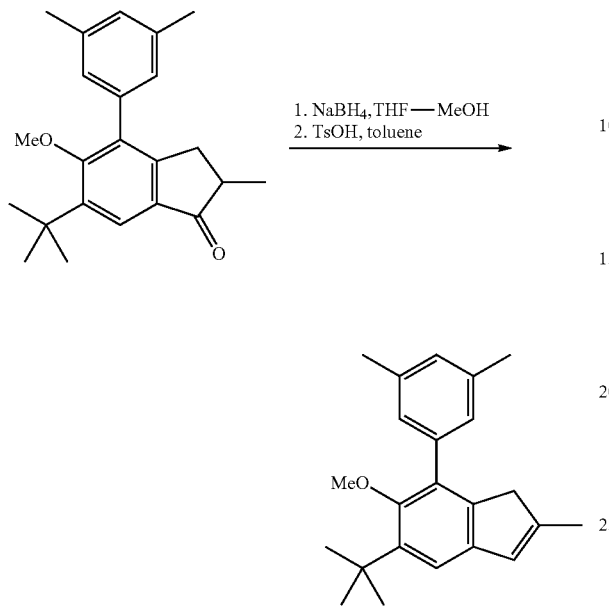

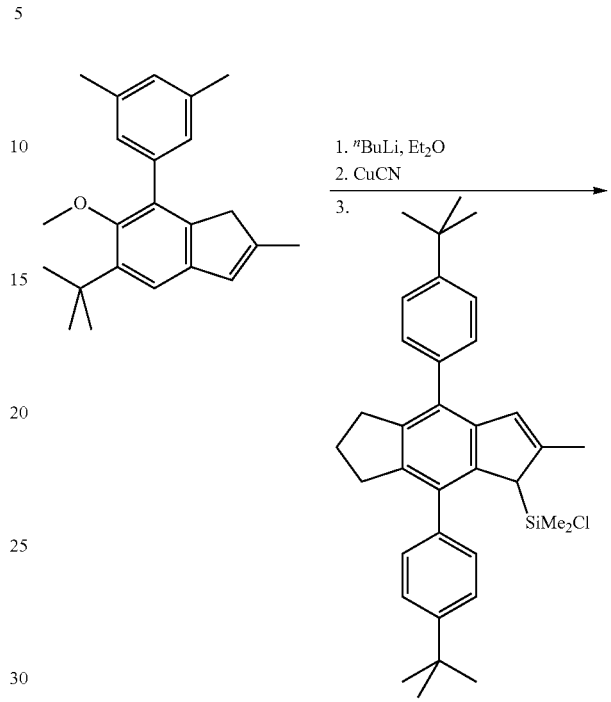

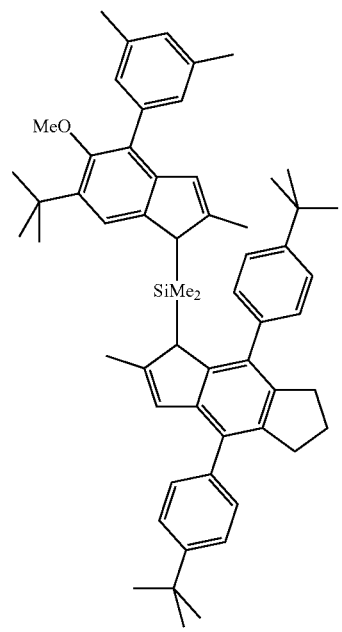

8.2 g (217 mmol) of NaBH$_4$ was added to a solution of 48.43 g (143.9 mmol) of 2-methyl-4-(3,5-dimethylphenyl)-5-methoxy-6-tert-butylindan-1-one in 300 ml of THF cooled to 5° C. Then, 150 ml of methanol was added dropwise to this mixture by vigorous stirring for ca. 7 h at 5° C. The resulting mixture was evaporated to dryness, and the residue was partitioned between 500 ml of dichloromethane and 500 ml of 2 M HCl. The organic layer was separated, the aqueous layer was additionally extracted with 100 ml of dichloromethane. The combined organic extract was evaporated to dryness to give a slightly yellowish oil. To a solution of this oil in 600 ml of toluene 400 mg of TsOH was added, this mixture was refluxed with Dean-Stark head for 10 min and then cooled to room temperature using a water bath. The formed solution was washed by 10% Na$_2$CO$_3$, the organic layer was separated, the aqueous layer was extracted with 150 ml of dichloromethane. The combined organic extract was dried over K$_2$CO$_3$ and then passed through a short layer of silica gel 60 (40-63 μm). The silica gel layer was additionally washed by 100 ml of dichloromethane. The combined organic elute was evaporated to dryness, and the resulting oil was dried in vacuum at elevated temperature. This procedure gave 45.34 g (98%) of 2-methyl-5-tert-butyl-6-methoxy-7-(3,5-dimethylphenyl)-1H-indene which was used without additional purification.

Anal. calc. for C$_{23}$H$_{28}$O: C, 86.20; H, 8.81. Found: C, 86.29; H, 9.07.

$^1$H NMR (CDCl$_3$): δ 7.20 (s, 1H), 7.08 (br.s, 1H), 6.98 (br.s, 1H), 6.42 (m, 1H), 3.25 (s, 3H), 3.11 (s, 2H), 2.36 (s, 6H), 2.06 (s, 3H), 1.43 (s, 9H). $^{13}$C{$^1$H} NMR (CDCl$_3$): δ 154.20, 145.22, 141.78, 140.82, 140.64, 138.30, 137.64, 131.80, 128.44, 127.18, 126.85, 116.98, 60.65, 42.80, 35.12, 31.01, 21.41, 16.65.

To a solution of 8.26 g (25.78 mmol) of 5-tert-butyl-7-(3,5-dimethylphenyl)-6-methoxy-2-methyl-1H-indene in 200 ml of ether 10.5 ml (25.52 mmol) of 2.43 M $^n$BuLi in hexanes was added in one portion at −50° C. This mixture was stirred overnight at room temperature, then the resulting light-orange solution with a small amount of precipitate was cooled to −50° C., and 200 mg of CuCN was added. The obtained mixture was stirred for 0.5 h at −25° C., then a solution of [4,8-di(4-tert-butylphenyl)-2-methyl-1,5,6,7-tetrahydro-s-indacen-1-yl]chlorodimethylsilane (prepared above, 25.01 mmol) in a mixture of 150 ml of ether and 50 ml of THF was added in one portion. The obtained mixture was stirred overnight at room temperature, then filtered through a pad of silica gel 60 (40-63 μm) which was additionally washed by 2×50 ml of dichloromethane. The combined filtrate was evaporated under a reduced pressure, and the residue was dried in vacuum at elevated temperature. This procedure gave 21.36 g (ca. 100%) of [4,8-di(4-tert-butylphenyl)-2-methyl-1,5,6,7-tetrahydro-s-indacen-1-yl][6-tert-butyl-4-(3,5-dimethylphenyl)-5-methoxy-2-methyl-11H-inden-1-yl]dimethylsilane (~95% purity by NMR, a ~1:1 mixture of stereoisomers) as a white powder which was further used without an additional purification.

$^1$H NMR (CDCl$_3$): δ 7.59-7.33 (m, 8H), 7.19, 7.07, 7.02 and 6.94 (4s, sum 4H), 6.54 (s, 1H), 6.20 and 6.15 (2s, sum 1H), 4.33 and 4.18 (2s, sum 1H), 3.21 and 3.20 (2s, sum 3H), 3.31-3.16 (m, 1H), 3.05-2.82 (m, 2H), 2.72-2.60 (m, 1H), 2.38 and 2.37 (2s, 1H), 2.35 and 2.34 (2s, sum 6H), 2.07, 2.05, 1.94 and 1.60 (4s, sum 6H), 2.16-2.02 (m, 1H), 1.99-1.88 (m, 1H), 1.44 and 1.43 (2s, sum 9H), 1.39 (s, 9H), 1.22 and 1.11 (2s, sum 9H), −0.49, −0.61, −0.64 and −0.69 (4s, sum 6H).

Anti-dimethylsilanedlyl[2-methyl-4,8-di(4-tert-butylphenyl)-1,5,6,7-tetrahydro-s indacen-1-yl][2-methyl-4-(3,5-dimethylphenyl)-5-methoxy-6-tert-butylinden-1-yl]zirconium dichloride

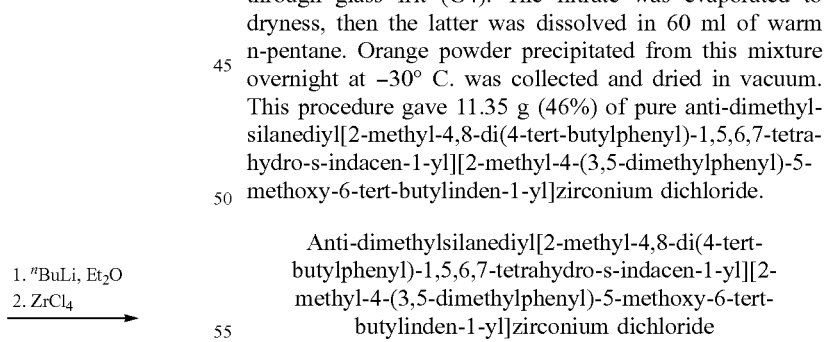

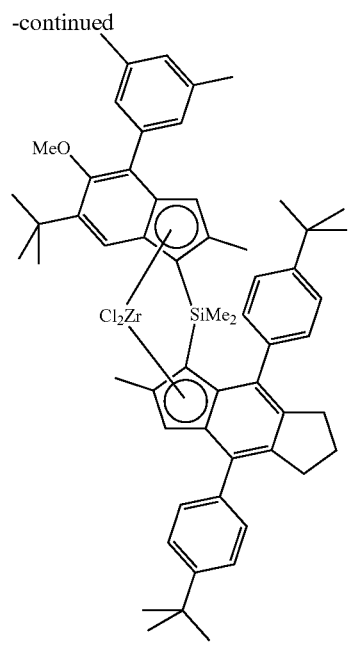

To a solution of 20.6 g (25.4 mmol) of [4,8-di(4-tert-butylphenyl)-2-methyl-1,5,6,7-tetrahydro-s-indacen-1-yl][6-tert-butyl-4-(3,5-dimethylphenyl)-5-methoxy-2-methyl-11H-inden-1-yl]dimethylsilane in 200 ml of ether, cooled to −50° C., 20.9 ml (50.8 mmol) of 2.43 M $^n$BuLi in hexanes was added in one portion. This mixture was stirred overnight at room temperature, then, the resulting dark-red solution was cooled to −60° C., and 5.92 g (25.4 mmol) of ZrCl4 was added. The reaction mixture was stirred for 24 h at room temperature to give red solution with precipitate of LiCl. On the evidence of NMR spectroscopy, this solution included a ca. 3:1 mixture of anti- and syn-zirconocene dichlorides contaminated with some other impurities. This mixture was evaporated to dryness, and the residue was treated with 150 ml of warm toluene. The obtained suspension was filtered through glass frit (G4). The filtrate was evaporated to dryness, then the latter was dissolved in 60 ml of warm n-pentane. Orange powder precipitated from this mixture overnight at −30° C. was collected and dried in vacuum. This procedure gave 11.35 g (46%) of pure anti-dimethylsilanediyl[2-methyl-4,8-di(4-tert-butylphenyl)-1,5,6,7-tetrahydro-s-indacen-1-yl][2-methyl-4-(3,5-dimethylphenyl)-5-methoxy-6-tert-butylinden-1-yl]zirconium dichloride.

Anti-dimethylsilanediyl[2-methyl-4,8-di(4-tert-butylphenyl)-1,5,6,7-tetrahydro-s-indacen-1-yl][2-methyl-4-(3,5-dimethylphenyl)-5-methoxy-6-tert-butylinden-1-yl]zirconium dichloride Anal. calc. for C$_{58}$H$_{68}$Cl$_2$OSiZr: C, 71.71; H, 7.06. Found: C, 71.93; H, 7.30.

$^1$H NMR (CDCl$_3$): δ 7.65-7.02 (m, 11H), 6.95 (s, 1H), 6.85 (s, 1H), 6.60 (s, 1H), 3.42 (s, 3H), 3.15-3.01 (m, 2H), 3.01-2.91 (m, 1H), 2.53-2.41 (m, 1H), 2.34 (s, 6H), 2.29 (s, 3H), 2.04 (s, 3H), 2.03-1.94 (m, 1H), 1.84-1.68 (m, 1H), 1.39 (s, 9H), 1.34 (2s, sum 18H), 1.13 (s, 3H), −0.17 (s, 3H). $^{13}$C{$^1$H} NMR (CDCl$_3$): δ 159.92, 150.58, 149.72, 144.85, 144.23, 143.43, 138.59, 137.85, 136.85, 135.58, 134.74, 134.20, 131.85, 131.81, 131.74, 131.26, 130.85, 129.37, 128.93, 128.80, 127.38, 126.80, 125.96, 125.09, 124.72, 123.13, 121.92, 121.08, 82.42, 82.05, 62.64, 35.68, 34.70, 34.60, 33.77, 32.40, 31.41, 31.37, 30.37, 26.07, 21.42, 19.77, 18.64, 3.58, 1.23.

Synthesis of MC-2

4,8-Di(3,5-dimethylphenyl)-6-methyl-1,2,3,5-tetrahydro-s-indacene

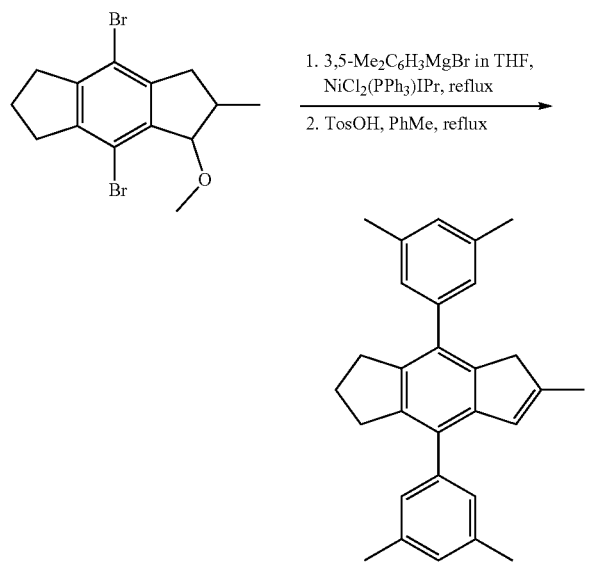

To a mixture of 2.0 g (2.56 mmol) of NiCl$_2$(PPh$_3$)IPr and 36.3 g (100.8 mmol) of 4,8-dibromo-1-methoxy-2-methyl-1,2,3,5,6,7-hexahydro-s-indacene 500 ml (250 mmol, 2.5 equiv) of 0.5 M 3,5-dimethylphenylmagnesium bromide in THF was added at a such rate to maintain a gentle reflux (for ca. 15 min). The resulting solution was refluxed additionally for 1 h, then cooled to room temperature, and 1200 ml of 0.5 M HCl and 500 ml of dichloromethane were added. The organic layer was separated, dried over K2CO$_3$, passed through a short pad of silica gel 60 (40-63 µm, ca. 30 ml) and then evaporated to dryness to give the crude mixture of the diastereoisomers of 4,8-di(3,5-dimethylphenyl)-1-methoxy-2-methyl-1,2,3,5,6,7-hexahydro-s-indacene as a brownish oil. Further on, 315 mg of TsOH was added to a solution of the crude product in 420 ml of toluene, and the resulting mixture was refluxed using Dean-Stark head for 10 min. Then, one more portion of 220 mg of TsOH was added, and the obtained mixture was refluxed for 10 min. Finally, the last operation was repeated with 50 mg of TsOH. After cooling to room temperature the reaction mixture was washed with 200 ml of 10% K2CO$_3$. The organic layer was separated, and the aqueous layer was additionally extracted with 200 ml of dichloromethane. The combined organic extract was dried over anhydrous K$_2$CO$_3$ (the organic layer became crimson at this stage), passed through a short pad of silica gel 60 (40-63 µm, 30 ml), and the resulting light-yellow solution was evaporated to ca. 30 ml to give a solution with a significant amount of a white precipitate. To this mixture 300 ml of n-hexane was added. The precipitated solid was filtered off (G3), washed with n-hexane, and dried in vacuum. This procedure gave 29.33 g (77.48 mmol, 76.9%) of 4,8-di(3,5-dimethylphenyl)-6-methyl-1,2,3,5-tetrahydro-s-indacene as a white fine-crystalline solid. The mother liquor was evaporated to dryness to give a yellowish solid mass. This mass was triturated with 40 ml of warm n-hexane, cooled to room temperature, and filtered off (G3). The obtained solid was washed with n-hexane and dried in vacuum. This procedure gave additionally 4.55 g (12.02 mmol, 11.9%) of 4,8-di(3,5-dimethylphenyl)-6-methyl-1,2,3,5-tetrahydro-s-indacene as a white powder. Thus, the total yield the title product was 33.88 g (89.5 mmol, 88.8%).

$^1$H NMR (CDCl$_3$): δ 7.04 (s, 2H), 7.03 (s, 2H), 6.98 (s, 2H), 6.43 (m, 1H), 3.23 (s, 2H), 2.89 (t, J=7.3 Hz, 2H), 2.83 (t, J=7.3 Hz, 2H), 2.38 (s, 6H), 2.37 (s, 6H), 2.04 (s, 3H), 1.99 (quint, J=7.3 Hz, 2H). $^{13}$C{$^1$H} NMR (CDCl$_3$): δ 145.38, 142.84, 140.85, 140.43, 140.21, 139.80, 138.37, 137.55, 137.39, 133.44, 129.64, 128.39, 128.19, 127.31, 126.61, 126.34, 42.49, 32.76, 32.51, 26.08, 21.43, 16.81

[4,8-Bis(3,5-dimethylphenyl)-2-methyl-1,5,6,7-tetrahydro-s-indacen-1-yl]chlorodimethylsilane

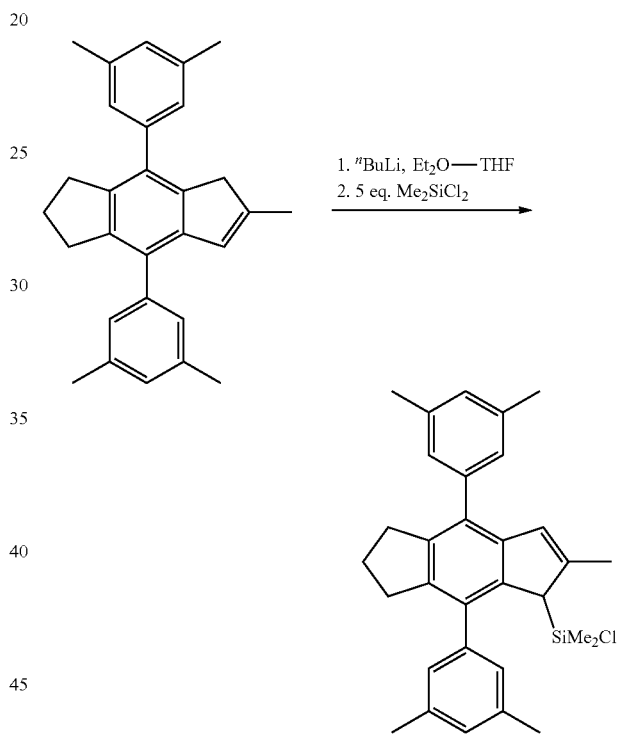

To a suspension of 11.96 g (31.59 mmol) of 4,8-di(3,5-dimethylphenyl)-6-methyl-1,2,3,5-tetrahydro-s-indacene in a mixture of 250 ml of ether and 40 ml of THF, cooled to −30° C., 13.0 ml (31.59 mmol) of 2.43 M $^n$BuLi in hexanes was added in one portion. The resulting mixture was stirred overnight at room temperature, then thus obtained light-orange solution with a large amount of orange precipitate was cooled to −50° C., and 19.0 ml (20.33 g, 157.5 mmol, 4.99 eqv.) of dichlorodimethylsilane was added in one portion. This mixture was stirred overnight at room temperature and then filtered through a glass frit (G3), the flask and filter cake were rinsed with 50 ml of toluene. The filtrate was evaporated to dryness to give 14.9 g (~100%) of the title compound as a white solid mass which was further used without an additional purification.

$^1$H NMR (CDCl$_3$): δ 7.09 (s, 2H), 7.02-6.94 (m, 4H), 6.51 (m, 1H), 4.07 (s, 1H), 3.26-3.14 (m, 1H), 2.95-2.79 (m, 2H), 2.60 (ddd, J=12.4 Hz, J=8.4 Hz, J=4.1 Hz, 1H), 2.38 and 2.37 (2s, sum 12H), 2.24 (s, 3H), 2.12-1.99 (m, 1H), 1.95-1.80 (m, 1H), −0.16 (s, 3H), −0.20 (s, 3H). $^{13}$C{$^{1}$H} NMR (CDCl$_3$): δ 146.19, 143.17, 140.68, 140.29, 139.94, 139.92, 138.37, 137.59, 137.42, 132.60, 129.86, 128.52, 128.24, 127.85, 127.28, 126.32, 49.67, 33.33, 32.73, 26.15, 21.45, 21.42, 18.10, 3.92, −1.45.

[4,8-Bis(3,5-dimethylphenyl)-2-methyl-1,5,6,7-tetra-hydro-s-indacen-1-yl][6-tert-butyl-4-(3,5-dimethylphenyl)-5-methoxy-2-methyl-1H-inden-1-yl]dimethylsilane

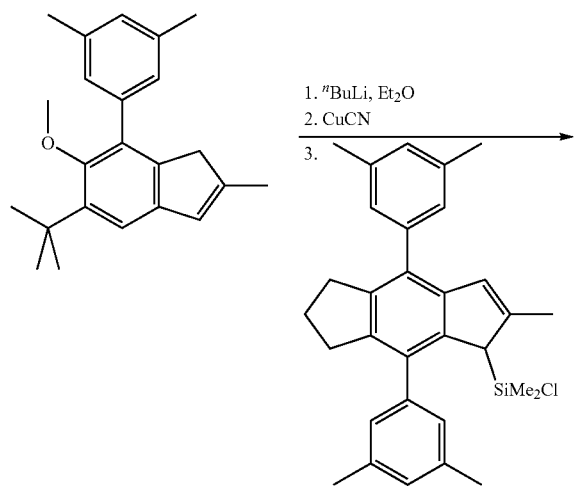

To a solution of 10.13 g (31.59 mmol) of 5-tert-butyl-7-(3,5-dimethylphenyl)-6-methoxy-2-methyl-1H-indene (produced as described above for MC-1) in 250 ml of ether, cooled to −30° C., 13.0 ml (31.59 mmol) of 2.43 M $^n$BuLi in hexanes was added in one portion. This mixture was stirred overnight at room temperature, then the resulting light-orange solution with a small amount of precipitate was cooled to −45° C., and 200 mg of CuCN was added. The obtained mixture was stirred for 0.5 h at −25° C., then a solution of 14.9 g (31.59 mmol) of [4,8-bis(3,5-dimethylphenyl)-2-methyl-1,5,6,7-tetrahydro-s-indacen-1-yl]chlorodimethylsilane (prepared above) in 200 ml of THF was added in one portion. This mixture was stirred overnight at room temperature, then filtered through a pad of silica gel 60 (40-63 μm), which was additionally washed by 2×50 ml of dichloromethane. The combined organic elute was evaporated to dryness, and the residue was dried in vacuum at elevated temperature to give 24.0 g (ca. 100% of ca. 90% purity) of the title product (ca. 55:45 mixture of the stereoisomers) as a slightly yellowish solid foam which was further used without an additional purification.

$^1$H NMR (CDCl$_3$): δ 7.27 and 7.25 (2s, sum 2H), 7.04 (s, 4H), 6.98, 6.95 and 6.93 (3s, sum 3H), 6.90 and 6.85 (2s, sum 1H), 6.46 (s, 1H), 6.23 and 6.20 (2s, sum 1H), 4.41 and 4.16 (2s, sum 1H), 3.30-2.62 (m, 1H), 3.22 and 3.20 (2s, sum 3H), 3.04-2.79 (m, 2H), 2.68-2.56 (m, 1H), 2.39 (s, 6H), 2.35 (s, 9H), 2.32 (s, 3H), 2.18-1.80 (6s and 2m, sum 9H), 1.44 and 1.38 (2s, sum 9H), −0.52, −0.58, −0.62 and −0.73 (4s, sum 6H).

Anti-dimethylsilanedlyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride

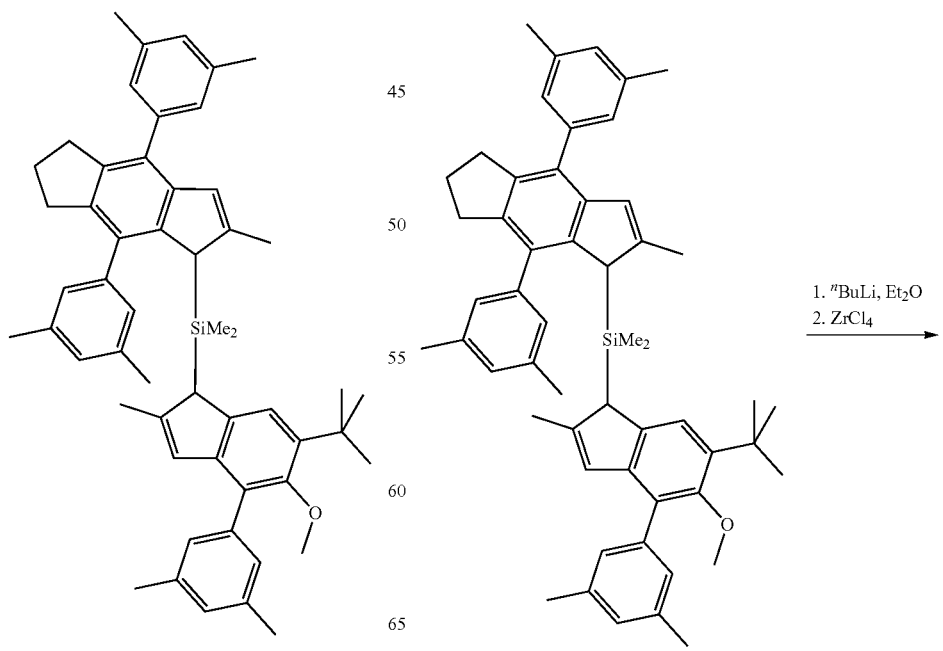

-continued

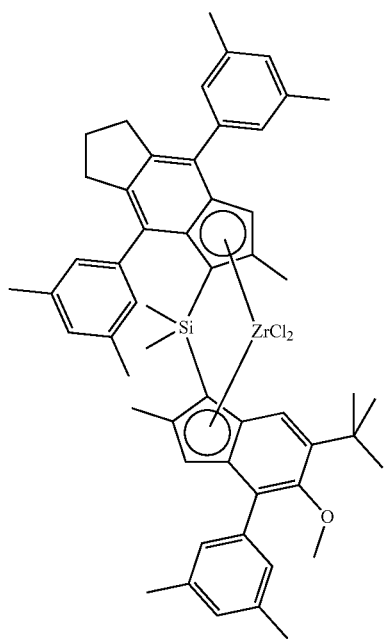

To a slightly cloudy yellowish solution of 23.06 g (30.54 mmol) of [4,8-bis(3,5-dimethylphenyl)-2-methyl-1,5,6,7-tetrahydro-s-indacen-1-yl][6-tert-butyl-4-(3,5-dimethylphenyl)-5-methoxy-2-methyl-1H-inden-1-yl]dimethylsilane in 250 ml of ether, cooled to −30° C., 25.1 ml (60.99 mmol) of 2.43 M $^n$BuLi in hexanes was added in one portion. This mixture was stirred for 5.5 h at room temperature, then, the resulting red solution was cooled to −50° C., and 7.12 g (30.55 mmol) of ZrCl$_4$ was added. The reaction mixture was stirred for 24 h at room temperature to give dark-red solution with precipitate of LiCl. On the evidence of NMR spectroscopy, this solution included a ca. 85/15 mixture of anti- and syn-zirconocene dichlorides contaminated with some other impurities. This mixture was evaporated to dryness (to the state of red foam), and the residue was treated with 100 ml of warm toluene. The obtained suspension was filtered through glass frit (G4), the filter cake was washed with 2×50 ml of warm toluene. The filtrate was evaporated to dryness, and the residue was dissolved in 70 ml of hot n-hexane. The light-orange precipitate fallen from this solution overnight at room temperature was collected and dried in vacuum. This procedure gave 7.8 g of anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride, containing ca. 1.0 mol of n-hexane per mol of the complex, so the adjusted net weight of the isolated anti-complex was 7.13 g (26%). The mother liquor was evaporated to ca. 60 ml. Light-orange powder precipitated from this solution overnight at −25° C. was collected and dried in vacuum. This procedure gave 8.6 g of anti-dimethylsilanediyl[2-methyl-4,8-di(3,5-dimethylphenyl)-1,5,6,7-tetrahydro-s-indacen-1-yl][2-methyl-4-(3, 5-dimethylphenyl)-5-methoxy-6-tert-butylinden-1-yl]zirconium dichloride, containing ca. 0.75 mol of n-hexane per mol of the complex (or 0.57 g of n-hexane in 8.6 g of the product), so the adjusted net weight of the isolated anti-complex was 8.03 g (29%).

Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride x 1.0 $^n$hexane Anal. calc. for $C_{54}H_{60}Cl_2OSiZr$ x $C_6H_{14}$: C, 71.96; H, 7.45. Found: C, 72.30; H, 7.69.

$^1$H NMR (CDCl$_3$): δ 7.55-6.90 (very br.s., 4H), 7.39 (s, 1H), 7.10 (s, 1H), 7.03 (s, 1H), 6.98 (s, 1H), 6.95 (s, 1H), 6.94 (s, 1H), 6.81 (s, 1H), 6.58 (s, 1H), 3.41 (s, 3H), 3.15-3.01 (m, 2H), 2.93 (ddd, J=16.0 Hz, 8.1 Hz, 3.3 Hz, 1H), 2.51-2.41 (m, 1H), 2.39 (s, 3H), 2.36 (s, 3H), 2.34 (s, 12H), 2.30 (s, 3H), 2.04 (s, 3H), 2.07-1.95 (m, 1H), 1.85-1.68 (m, 1H), 1.35 (s, 9H), 1.14 (s, 3H), −0.13 (s, 3H). $^{13}$C{$^1$H} NMR (CDCl$_3$): δ 159.87, 144.73, 144.10, 143.25, 141.39, 138.39, 138.08, 137.81, 137.47, 136.90, 134.61, 134.39, 134.26, 132.05, 131.96, 131.74, 131.11, 128.96, 128.91, 128.82, 128.74, 127.74, 127.44, 127.01 (br.s), 126.76, 123.42, 123.12, 121.60, 121.08, 82.55, 81.91, 62.67, 35.68, 33.87, 32.39, 30.39, 26.04, 21.53, 21.47, 21.41, 21.24, 19.78, 18.60, 3.62, 1.70.

Synthesis of MC-3

[4,8-Bis(3,5-dimethylphenyl)-2-methyl-1,5,6,7-tetrahydro-s-indacen-1-yl][6-tertbutyl-4-(3,5-di-tert-butylphenyl)-5-methoxy-2-methyl-1H-inden-1-yl]dimethylsilane

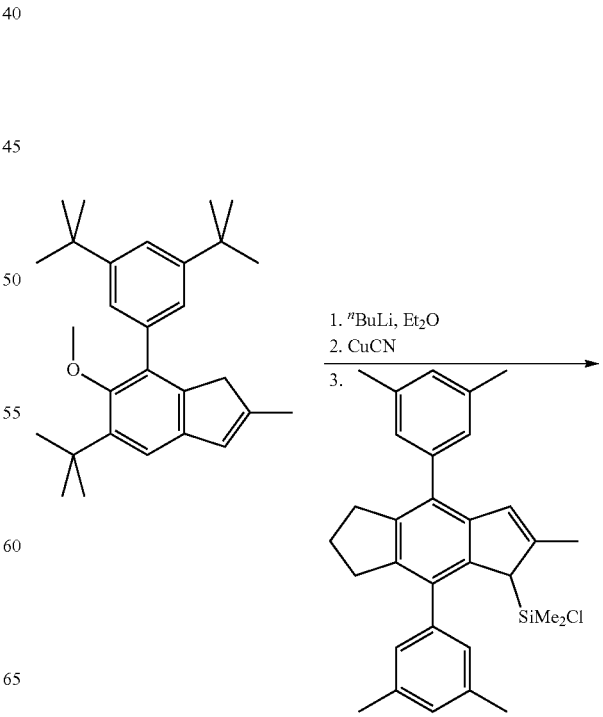

-continued

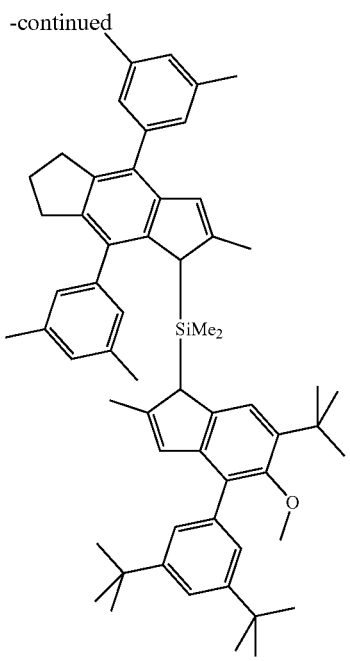

To a solution of 12.78 g (31.59 mmol) of 5-tert-butyl-7-(3,5-di-tert-butylphenyl)-6-methoxy-2-methyl-1H-indene in 250 ml of ether, cooled to −30° C., 13.0 ml (31.59 mmol) of 2.43 M $^n$BuLi in hexanes was added in one portion. This mixture was stirred overnight at room temperature, then the resulting light-yellow solution with a large amount of white precipitate was cooled to −45° C., and 200 mg of CuCN was added. The obtained mixture was stirred for 0.5 h at −25° C., then a solution of 14.9 g (31.59 mmol) of [4,8-bis(3,5-dimethylphenyl)-2-methyl-1,5,6,7-tetrahydro-s-indacen-1-yl]chlorodimethylsilane (prepared as described above) in 200 ml of THF was added in one portion. This mixture was stirred overnight at room temperature, then filtered through a pad of silica gel 60 (40-63 μm), which was additionally washed by 2×50 ml of dichloromethane. The combined organic elute was evaporated to dryness, and the yellowish residue was triturated with 100 ml of n-hexane. The obtained solid was filtered off (G3), washed with 2×25 ml of n-hexane and dried in vacuo to give 19.57 g of the title product as a white powder. The mother liquor was evaporated to dryness to give a yellowish solid mass. This mass was triturated with 20 ml of n-hexane, filtered off (G3), the obtained solid was washed with 10 ml of n-hexane and dried in vacuum. This procedure gave 4.87 g of the title product as a white powder. Thus, the total yield of this product (ca. 55:45 mixture of the stereoisomers) was 24.44 g (29.1 mmol, 92% of ca. 95% purity).

$^1$H NMR (CDCl$_3$): δ 7.35-7.22 (m, 5.5H), 7.04 (s, 2H), 6.98 (s, 1H), 6.93, 6.90 and 6.87 (3s, sum 1.5H), 6.46 (s, 1H), 6.30 and 6.26 (2s, sum 1H), 4.41-4.17 (2s, sum 1H), 3.32-3.13 (m, 1H), 3.14 and 3.12 (2s, sum 3H), 3.02-2.81 (m, 2H), 2.68-2.56 (m, 1H), 2.39 (s, 6H), 2.35 (s, 3H), 2.33 (s, 3H), 2.24-1.81 (6s and 2m, sum 9H), 1.44 and 1.39 (2s, sum 9H), 1.35 and 1.34 (2s, sum 18H), −0.52, −0.59, −0.63 and −0.71 (4s, sum 6H).

Anti-dimethylsilanedlyl[2-methyl-4,8-di(3,5-dimethylphenyl)-1,5,6,7-tetrahydro-s-indacen-1-yl][2-methyl-4-(3,5-di-tert-butylphenyl)-5-methoxy-6-tert-butylinden-1-yl]zirconium dichloride

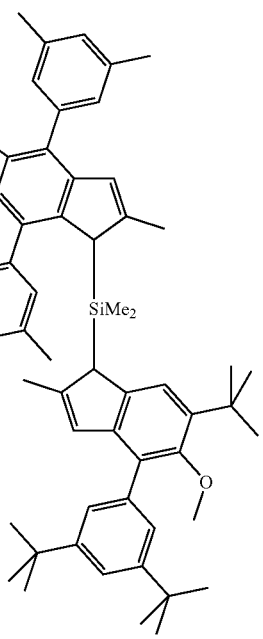

1. $^n$BuLi, Et$_2$O
2. ZrCl$_4$

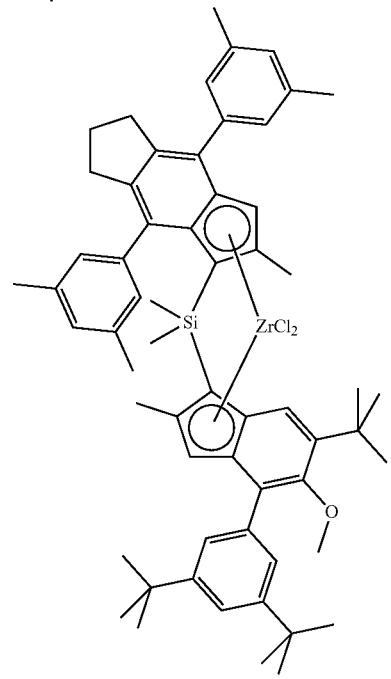

To a slightly cloudy yellowish solution of 24.39 g (29.06 mmol) of [4,8-bis(3,5-dimethylphenyl)-2-methyl-1,5,6,7-tetrahydro-s-indacen-1-yl][6-tert-butyl-4-(3,5-di-tert-butylphenyl)-5-methoxy-2-methyl-1H-inden-1-yl]dimethylsilane in 250 ml of ether, cooled to −30° C., 23.9 ml (58.08 mmol) of 2.43 M $^n$BuLi in hexanes was added in one portion. This mixture was stirred for 5.5 h at room temperature, then, the resulting red solution was cooled to −50° C., and 6.77 g (29.05 mmol) of ZrCl$_4$ was added. The reaction mixture was stirred for 24 h at room temperature to give a dark-red solution with precipitate of LiCl. On the evidence of NMR spectroscopy, this solution included a ca. 90/10 mixture of anti- and syn-zirconocene dichlorides contaminated with some other impurities. This mixture was evaporated to dryness (to the state of red foam), and the residue was treated with 100 ml of warm toluene. The obtained suspension was filtered through glass frit (G4), the filter cake was washed with 2×50 ml of warm toluene. The combined filtrate was evaporated to dryness, the residue was dissolved in 60 ml of hot n-hexane, and 10 ml of n-pentane was added. The light-orange precipitate fallen from this solution overnight at room temperature was collected and dried in vacuum. This procedure gave 15.2 g of the title anti-complex containing ca. 0.7 mol of n-hexane per mol of the complex (or 0.87 g of n-hexane in 15.2 g of the complex), so the adjusted net weight of the isolated anti-complex was 14.33 g (49%). The mother liquor was evaporated to ca. 50 ml. Light-orange powder precipitated from this solution overnight at −25° C. was collected and dried in vacuum. This procedure gave 4.8 g of a mixture of anti- and syn-complexes in a ratio ca. 86/14, containing ca. 0.36 mol of n-hexane per mol of complex (or 0.14 g of n-hexane in 4.8 g of the complex), so the adjusted net weight of the isolated mixture was 4.66 g (16%).

Anti-dimethylsilanediyl[2-methyl-4,8-di(3,5-dimethylphenyl)-1,5,6,7-tetrahydro-s-indacen-1-yl][2-methyl-4-(3,5-di-tert-butylphenyl)-5-methoxy-6-tert-butylinden-1-yl]zirconium dichloride Anal. calc. for $C_{60}H_{72}Cl_2OSiZr \times 0.7C_6H_{14}$: C, 72.76; H, 7.78. Found: C, 72.70; H, 8.05.

$^1$H NMR (CDCl$_3$): δ 7.74-7.18 (very br.s., 3H), 7.41 (s, 1H), 7.34 (t, J=1.8 Hz, 1H), 7.17-6.81 (very br.s., 1H), 7.09 (s, 1H), 7.03 (s, 1H), 6.98 (s, 1H), 6.95 (s, 1H), 6.70 (s, 1H), 6.61 (s, 1H), 3.27 (s, 3H), 3.14-3.00 (m, 2H), 2.95 (ddd, J=16.0 Hz, J=8.1 Hz, J=3.6 Hz, 1H), 2.44 (ddd, J=16.6 Hz, J=8.3 Hz, J=3.4 Hz, 1H), 2.38 (s, 3H), 2.37 (s, 3H), 2.32 (s, 6H), 2.29 (s, 3H), 2.07-1.96 (m, 1H), 2.03 (s, 3H), 1.89-1.71 (m, 1H), 1.35 (s, 9H), 1.34 (s, 18H), 1.14 (s, 3H), −0.14 (s, 3H). $^{13}$C{$^1$H} NMR (CDCl$_3$): δ 159.93, 150.62, 144.70, 143.99, 143.10, 141.41, 138.47, 138.10, 137.50, 135.90, 134.75, 134.53, 134.48, 132.04, 131.44, 131.29, 128.95, 128.82, 128.74, 127.70, 127.31, 124.44, 124.10, 123.01, 121.11, 120.89, 120.26, 82.55, 81.24, 62.28, 35.69, 34.98, 34.12, 33.84, 32.12, 31.48, 30.36, 25.93, 22.34, 21.50, 21.24, 19.67, 18.82, 14.07, 3.70, 1.65.

Synthesis of Comparative Metallocene MC-C1 (According to WO/2018/122134, Synthesis of MC-IE3)

4-(4-tert-Butylphenyl)-1-methoxy-2-methyl-1,2,3,5,6,7-hexahydro-s-indacene

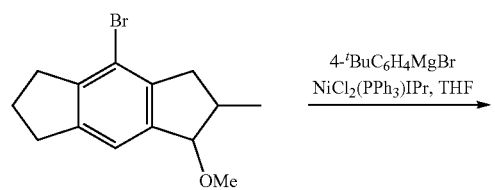

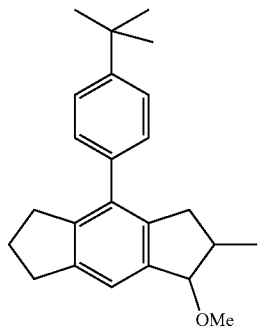

The precursor 4-bromo-1-methoxy-2-methyl-1,2,3,5,6,7-hexahydro-s-indacene was made according to the procedure described in WO2015/158790 A2 (pp 26-29).

To a mixture of 1.5 g (1.92 mmol, 0.6 mol. %) of NiCl$_2$(PPh$_3$)IPr and 89.5 g (318.3 mmol) of 4-bromo-1-methoxy-2-methyl-1,2,3,5,6,7-hexahydro-s-indacene, 500 ml (500 mmol, 1.57 equiv) of 1.0 M 4-tert-butylphenylmagnesium bromide in THF was added. The resulting solution was refluxed for 3 h, then cooled to room temperature, and 1000 ml of 0.5 M HCl was added. Further on, this mixture was extracted with 1000 ml of dichloromethane, the organic layer was separated, and the aqueous layer was extracted with 250 ml of dichloromethane. The combined organic extract was evaporated to dryness to give a greenish oil. The title product was isolated by flash-chromatography on silica gel 60 (40-63 μm; eluent:hexanes-dichloromethane=3:1, vol., then 1:3, vol.). This procedure gave 107 g (ca. 100%) of 1-methoxy-2-methyl-4-(4-tert-butylphenyl)-1,2,3,5,6,7-hexahydro-s-indacene as a white solid mass.

Anal. calc. for $C_{24}H_{30}O$: C, 86.18; H, 9.04. Found: C, 85.99; H, 9.18.

$^1$H NMR (CDCl$_3$), syn-isomer: δ 7.42-7.37 (m, 2H), 7.25-7.20 (m, 3H), 4.48 (d, J=5.5 Hz, 1H), 3.44 (s, 3H), 2.99-2.47 (m, 7H), 2.09-1.94 (m, 2H), 1.35 (s, 9H), 1.07 (d, J=6.9 Hz, 3H); Anti-isomer: δ 7.42-7.37 (m, 2H), 7.25-7.19 (m, 3H), 4.39 (d, J=3.9 Hz, 1H), 3.49 (s, 3H), 3.09 (dd, J=15.9 Hz, J=7.5 Hz, 1H), 2.94 (t, J=7.3 Hz, 2H), 2.78 (tm, J=7.3 Hz, 2H), 2.51-2.39 (m, 1H), 2.29 (dd, J=15.9 Hz, J=5.0 Hz, 1H), 2.01 (quin, J=7.3 Hz, 2H), 1.36 (s, 9H), 1.11 (d, J=7.1 Hz, 3H). $^{13}$C{$^1$H} NMR (CDCl$_3$), syn-isomer: δ 149.31, 142.71, 142.58, 141.46, 140.03, 136.71, 135.07, 128.55, 124.77, 120.02, 86.23, 56.74, 39.41, 37.65, 34.49, 33.06, 32.45, 31.38, 25.95, 13.68; Anti-isomer: δ 149.34, 143.21, 142.90, 140.86, 139.31, 136.69, 135.11, 128.49, 124.82, 119.98, 91.53, 56.50, 40.12, 37.76, 34.50, 33.04, 32.40, 31.38, 25.97, 19.35.

4-(4-tert-Butylphenyl)-6-methyl-1,2,3,5-tetrahydro-s-indacene

2-methyl-[4-(4-tert-butylphenyl)-1,5,6,7-tetrahydro-s-indacen-1-yl]chlorodimethylsilane

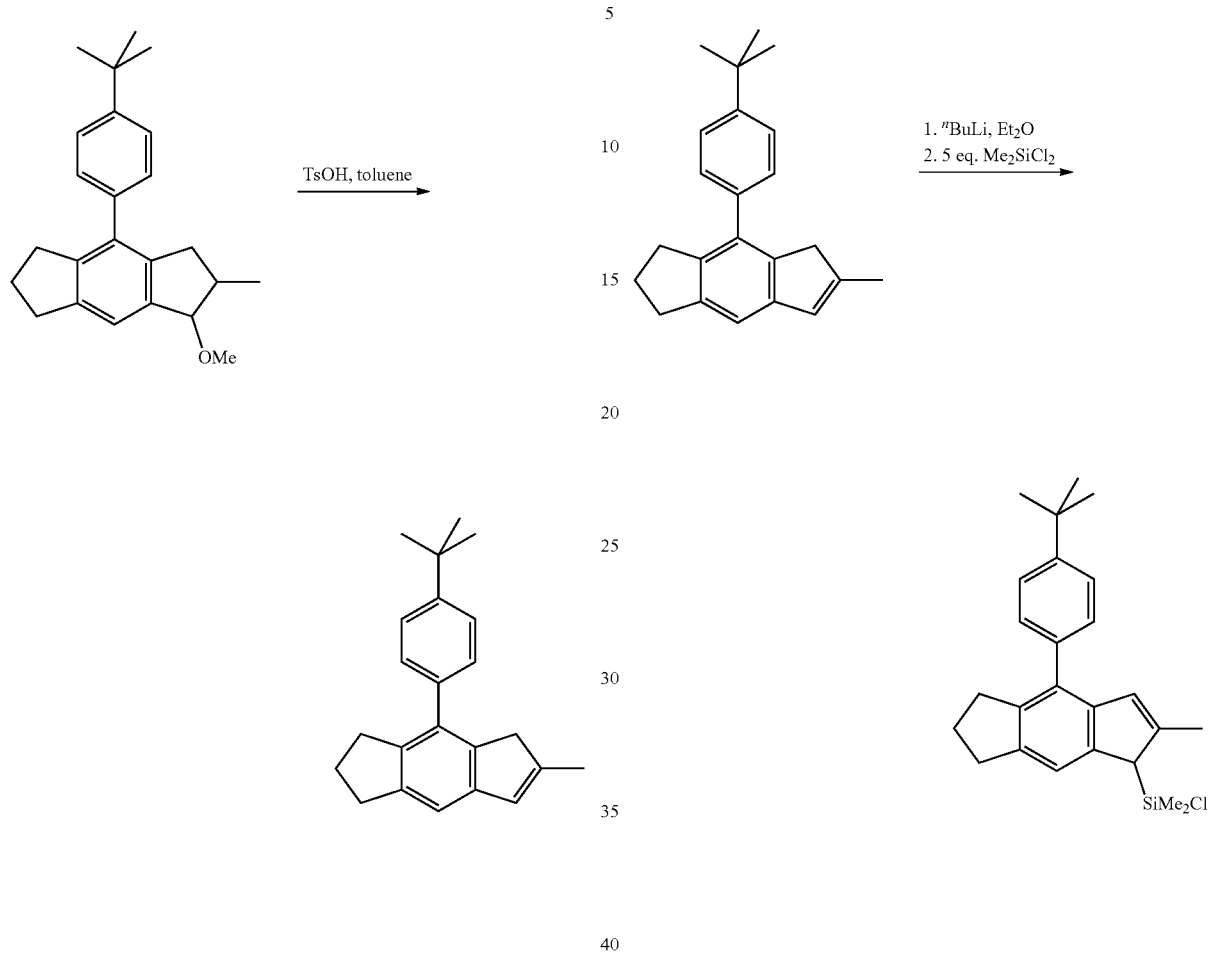

To a solution of 107 g 1-methoxy-2-methyl-4-(4-tert-butylphenyl)-1,2,3,5,6,7-hexahydro-s-indacene (prepared above) in 700 ml of toluene, 600 mg of TsOH was added, and the resulting solution was refluxed using Dean-Stark head for 10 min. After cooling to room temperature the reaction mixture was washed with 200 ml of 10% NaHCO$_3$. The organic layer was separated, and the aqueous layer was additionally extracted with 2×100 ml of dichloromethane. The combined organic extract was evaporated to dryness to give a red oil. The product was purified by flash-chromatography on silica gel 60 (40-63 µm; eluent:hexanes, then hexanes-dichloromethane=5:1, vol.) followed by vacuum distillation, b.p. 210-216° C./5-6 mm Hg. This procedure gave 77.1 g (80%) of 4-(4-tert-butylphenyl)-6-methyl-1,2,3,5-tetrahydro-s-indacene as a yellowish glassy material.

Anal. calc. for C$_{23}$H$_{12}$: C, 91.34; H, 8.66. Found: C, 91.47; H, 8.50.

$^1$H NMR (CDCl$_3$): δ 7.44-7.37 (m, 2H), 7.33-7.26 (m, 2H), 7.10 (s, 1H), 6.45 (br.s, 1H), 3.17 (s, 2H), 2.95 (t, J=7.3 Hz, 2H), 2.78 (t, J=7.3 Hz, 2H), 2.07 (s, 3H), 2.02 (quin, J=7.3 Hz, 2H), 1.37 (s, 9H). $^{13}$C{$^1$H} NMR (CDCl$_3$): δ 149.37, 145.54, 144.79, 142.91, 139.92, 138.05, 137.15, 134.06, 128.36, 127.02, 124.96, 114.84, 42.11, 34.53, 33.25, 32.16, 31.41, 25.96, 16.77.

To a solution of 22.3 g (73.73 mmol) of 4-(4-tert-butylphenyl)-6-methyl-1,2,3,5-tetrahydro-s-indacene in 300 ml of ether, cooled to −50° C., 30.4 ml (73.87 mmol) of 2.43 M $^n$BuLi in hexanes was added in one portion. The resulting mixture was stirred overnight at room temperature, then the resulting suspension with a large amount of precipitate was cooled to −78° C. (wherein the precipitate was substantially dissolved to form an orange solution), and 47.6 g (369 mmol, 5 equiv.) of dichlorodimethylsilane was added in one portion. The obtained solution was stirred overnight at room temperature and then filtered through a glass frit (G4). The filtrate was evaporated to dryness to give 28.49 g (98%) of 2-methyl-[4-(4-tert-butylphenyl)-1,5,6,7-tetrahydro-s-indacen-1-yl]chlorodimethylsilane as a colorless glass which was used without further purification.

$^1$H NMR (CDCl$_3$): δ 7-50-7.45 (m, 2H), 7.36 (s, 1H), 7.35-7.32 (m, 2H), 6.60 (s, 1H), 3.60 (s, 1H), 3.10-2.82 (m, 4H), 2.24 (s, 3H), 2.08 (quin, J=7.3 Hz, 2H), 1.42 (s, 9H), 0.48 (s, 3H), 0.22 (s, 3H). $^{13}$C{$^1$H} NMR (CDCl$_3$): δ 149.27, 144.41, 142.15, 141.41, 139.94, 139.83, 136.85, 130.19, 129.07, 126.88, 124.86, 118.67, 49.76, 34.55, 33.27, 32.32, 31.44, 26.00, 17.6

[2-methyl-4-(3,5-dimethylphenyl)-5-methoxy-6-tert-butyl-1H-inden-1-yl][2-methyl-4-(4-tert-butylphenyl)-1,5,6,7-tetrahydro-s-indacen-1-yl]dimethylsilane

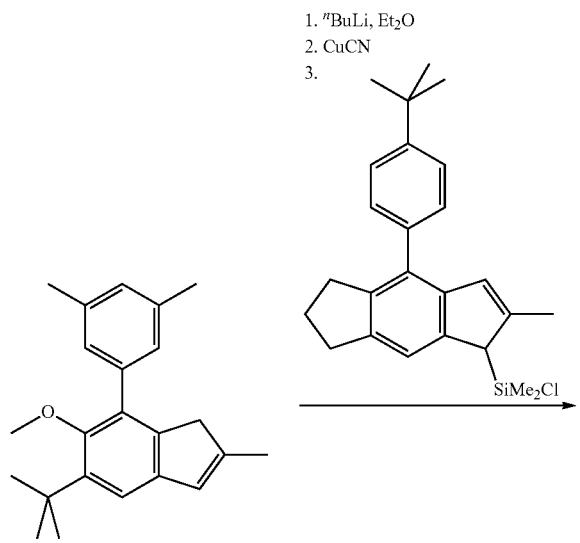

To a solution of 7.87 g (24.56 mmol) of 2-methyl-5-tert-butyl-6-methoxy-7-(3,5-dimethylphenyl)-1H-indene (produced as described above) in 150 ml of ether, 10.1 ml (24.54 mmol) of 2.43 M $^n$BuLi in hexanes was added in one portion at −50° C. This mixture was stirred overnight at room temperature, then the resulting yellow solution with a large amount of yellow precipitate was cooled to −50° C. (wherein the precipitate disappeared completely), and 150 mg of CuCN was added. The obtained mixture was stirred for 0.5 h at −25° C., then a solution of 9.70 g (24.55 mmol) of 2-methyl-[4-(4-tert-butylphenyl)-1,5,6,7-tetrahydro-s-indacen-1-yl]chlorodimethylsilane in 150 ml of ether was added in one portion. This mixture was stirred overnight at room temperature, then filtered through a pad of silica gel 60 (40-63 μm), which was additionally washed with 2×50 ml of dichloromethane. The combined filtrate was evaporated under reduced pressure, and the residue was dried in vacuum at elevated temperature. This procedure gave 16.2 g (97%) of [2-methyl-4-(3,5-dimethylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (>95% purity by NMR, approx. 1:1 mixture of the stereoisomers) as a yellowish glassy solid which was further used without an additional purification.

$^1$H NMR (CDCl$_3$): δ 7.49 (s, 0.5H), 7.47-7.42 (m, 2H), 7.37-7.32 (m, 2.5H), 7.25 (s, 0.5H), 7.22 (s, 0.5H), 7.15-7.09 (m, 2H), 7.01-6.97 (m, 1H), 6.57, 6.56 and 6.45 (3s, sum 2H), 3.70, 3.69, 3.67 and 3.65 (4s, sum 2H), 3.28 and 3.27 (2s, sum 3H), 3.01-2.79 (m, 4H), 2.38 (s, 6H), 2.19, 2.16 and 2.13 (3s, sum 6H), 2.07-2.00 (m, 2H), 1.43 and 1.41 (2s, sum 9H), 1.38 (s, 9H), −0.18, −0.19, −0.20 and −0.23 (4s, sum 6H). $^{13}$C{$^1$H} NMR (CDCl$_3$): δ 155.30, 155.27, 149.14, 149.10, 147.45, 147.38, 146.01, 145.77, 143.98, 143.92, 143.73, 143.68, 142.13, 142.09, 139.51, 139.41, 139.26, 139.23, 139.19, 139.15, 138.22, 137.51, 137.08, 137.05, 136.98, 130.05, 130.01, 129.11, 128.22, 127.90, 127.48, 127.44, 126.18, 126.13, 125.97, 125.92, 124.82, 120.55, 120.49, 118.50, 118.27, 60.54, 60.50, 47.34, 47.33, 46.87, 46.72, 35.14, 34.54, 33.34, 33.28, 32.30, 31.44, 31.25, 31.20, 26.02, 26.01, 21.45, 17.95, 17.87.

Anti-dimethylsilanedlyl[2-methyl-4-(3,5-dimethylphenyl)-5-methoxy-6-tert-butylinden-1-yl][2-methyl-4-(4-tert-butylphenyl)-1,5,6,7-tetrahydro-s-indacen-1-yl]zirconium dichloride

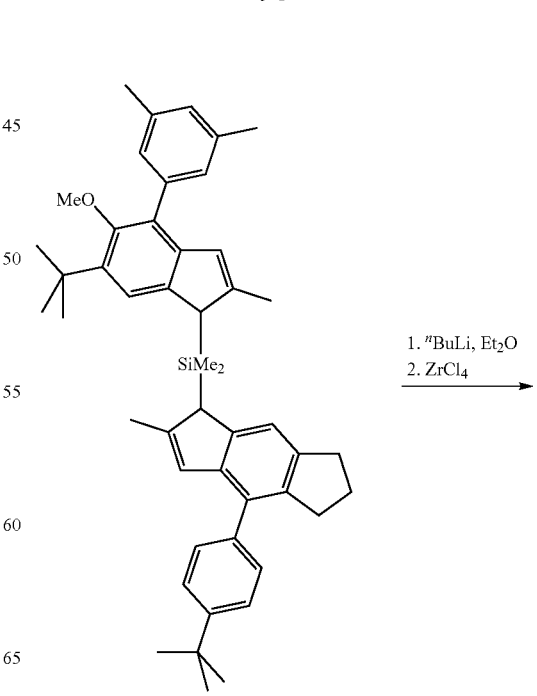

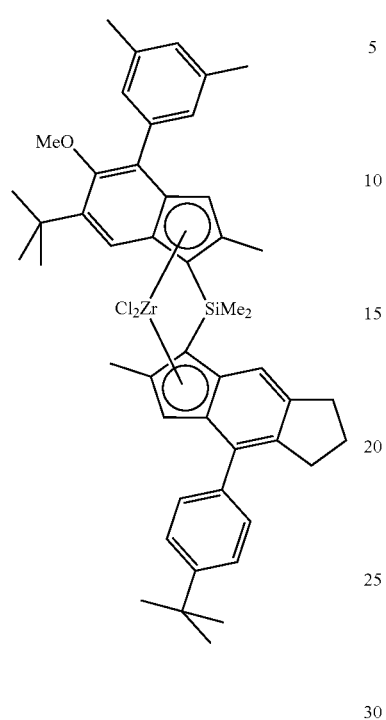

To a solution of 16.2 g (23.86 mmol) of [2-methyl-4-(3,5-dimethylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (prepared above) in 250 ml of ether, cooled to −50° C., 19.7 ml (47.87 mmol) of 2.43 M ″BuLi in hexanes was added in one portion. This mixture was stirred for 4 h at room temperature, then the resulting red solution was cooled to −50° C., and 5.57 g (23.9 mmol) of ZrCl₄ was added. The reaction mixture was stirred for 24 h at room temperature to give red solution with orange precipitate. This mixture was evaporated to dryness. The residue was treated with 150 ml of hot toluene, and the formed suspension was filtered through glass frit (G4). The filtrate was evaporated to 50 ml, and then 20 ml of n-hexane was added. The orange crystals precipitated from this solution overnight at room temperature were collected, washed with 10 ml of cold toluene, and dried in vacuum. This procedure gave 5.02 g (25%) of anti-zirconocene as a solvate with toluene (×0.75 toluene). The mother liquor was evaporated to ca. 30 ml, and 30 ml of n-hexane was added. The orange powder precipitated from this solution overnight at room temperature was collected and dried in vacuum. This procedure gave 6.89 g (34%) of a ca. 3 to 7 mixture of anti- and syn-zirconocenes. Thus, the total yield of rac-zirconocene isolated in this synthesis was 11.91 g (60%).

Anti-dimethylsilanediyl[2-methyl-4-(3,5-dimethylphenyl)-5-methoxy-6-tert-butylinden-1-yl][2-methyl-4-(4-tert-butylphenyl)-1,5,6,7-tetrahydro-s-indacen-1-yl]zirconium dichloride Anal. calc. for $C_{48}H_{56}Cl_2OsiZr \times 0.75C_7H_8$: C, 70.42; H, 6.88. Found: C, 70.51; H, 6.99.

¹H NMR (CDCl₃): δ 7.63-7.03 (very br.s, 2H), 7.59-7.51 (br.m, 2H), 7.51-7.42 (m, 4H), 6.98 (s, 1H), 6.78 (s, 1H), 6.60 (s, 1H), 3.46 (s, 3H), 3.11-3.04 (m, 1H), 3.04-2.93 (m, 2H), 2.88-2.81 (m, 1H), 2.36 (s, 6H), 2.22 (s, 3H), 2.21 (s, 3H), 2.12-1.94 (m, 2H), 1.41 (s, 9H), 1.36 (s, 9H), 1.32 (s, 3H), 1.31 (s, 3H). ¹³C{¹H} NMR (CDCl₃): δ 159.78, 149.90, 144.67, 144.07, 143.07, 136.75, 135.44, 135.40, 133.97, 133.51, 132.90, 132.23, 128.84, 128.76, 127.34, 127.01, 126.73, 125.28, 125.17, 122.89, 121.68, 121.59, 120.84, 117.94, 81.60, 81.26, 62.61, 35.73, 34.60, 33.20, 32.17, 31.36, 30.34, 26.56, 21.40, 18.41, 18.26, 2.65, 2.54.

Synthesis of Comparative Metallocene MC-C2

Metallocene MC-2 was synthetized according to WO/2018/122134, synthesis of MC-IE2.

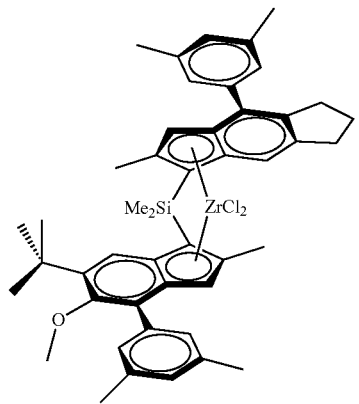

rac-anti-dimethylsilanediyl [2-methyl-4-(3',5'-dimethylphenyl)-1,5,6,7-tetrahydro-s-indacen-1-yl][2-methyl-4-(3',5'-dimethylphenyl)-5-methoxy-6-tert-butylinden-1-yl] zirconium dichloride Synthesis of Comparative Metallocene MC-C3

Metallocene MC-3 was synthetized according to WO/2018/122134, synthesis of MC-IE5.

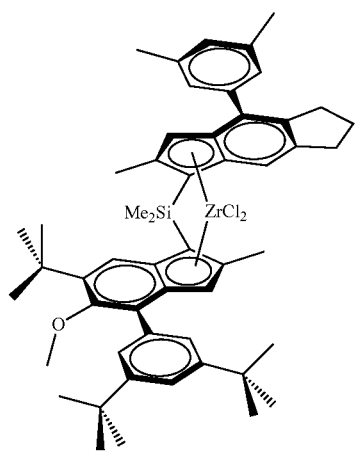

rac-anti-dimethylsilanediyl[2-methyl-4-(3',5'-dimethyl phenyl)-1,5,6,7-tetrahydro-s-indacen-1-yl][2-methyl-4-(3',5'-di-tert-butylphenyl)-5-methoxy-6-tert-butylinden-1-yl] zirconium dichloride.

Synthesis of Comparative Metallocene MC-C4

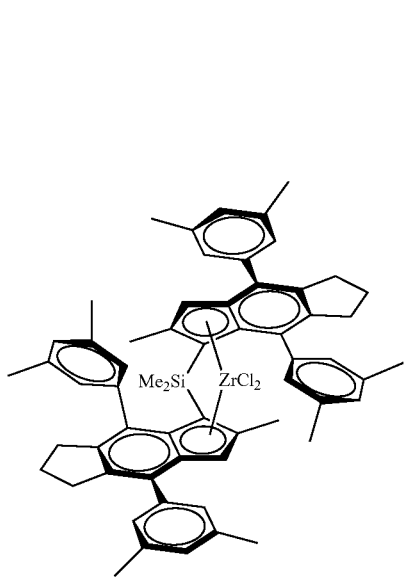

rac-dimethylsilanedylbis[2-methyl-4,8-bis(3',5'-dimethylphenyl)-1,5,6,7-tetrahydro-s-indacen-1-yl] zirconium dichloride, in short rac-Me$_2$Si[2-Me-4,8-(3',5'-Me$_2$Ph)$_2$-1,5,6,7-H$_4$-indacenyl]$_2$ZrCl$_2$ Bis[2-methyl-4,8-bis(3,5-dimethylphenyl)-1,5,6,7-tetrahydro-s-indacen-1-yl]dimethylsilane

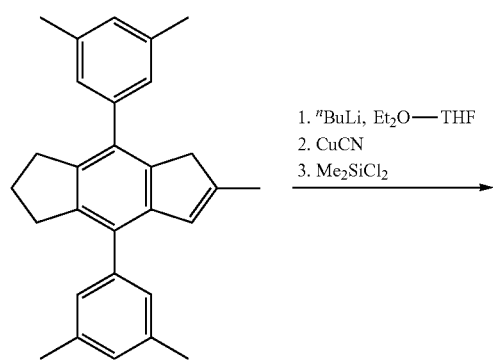

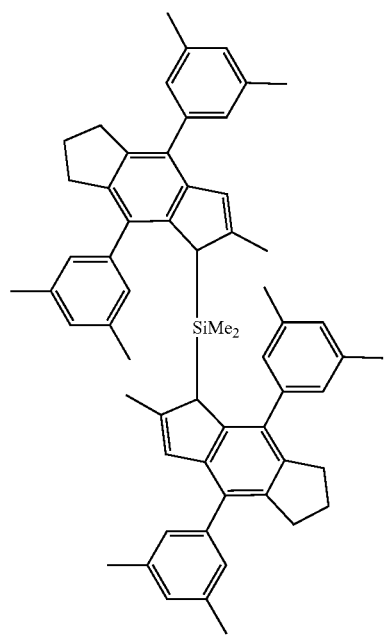

$^n$BuLi in hexanes (2.43 M, 18.8 ml, 45.68 mmol) was added in one portion to a suspension of 4,8-di(3,5-dimethylphenyl)-6-methyl-1,2,3,5-tetrahydro-s-indacene (17.28 g, 45.65 mmol) in a mixture of 350 ml of ether and 40 ml of THF cooled to −30° C. This mixture was stirred for 4 h at room temperature, then the resulting orange suspension was cooled to −40° C., and 250 mg of CuCN was added. The obtained mixture was stirred for 0.5 h at −25° C., and then dichlorodimethylsilane (2.95 g, 22.86 mmol) was added. The obtained mixture was stirred overnight at room temperature, then filtered through a pad of silica gel 60 (40-63 µm), which was additionally washed with 7×500 ml of dichloromethane. The combined organic elute was washed with 300 ml of water, dried over Na$_2$SO$_4$, and then evaporated to dryness. The yellowish residue was triturated with 200 ml of n-hexane. The formed suspension was filtered through glass frit (G3). The so obtained white precipitate was washed with 2×25 ml of n-hexane, and then dried in vacuum to give 14.61 g of the title product as a white powder. The mother liquor was evaporated to dryness to give a yellowish semisolid mass. This mass was triturated with 30 ml of n-hexane. The obtained suspension was filtered through glass frit (G3), the precipitate was washed with 2×30 ml of n-hexane and then dried in vacuo. This procedure gave additional 0.81 g of the title product. Thus, the total yield of bis[2-methyl-4,8-bis(3,5-dimethylphenyl)-1,5,6,7-tetrahydro-s-indacen-1-yl]dimethylsilane (a ca. 92:8 mixture of the stereoisomers) was 15.42 g (19.0 mmol, 83% of ca. 95% purity).

$^1$H NMR (CDCl$_3$), major isomer (rac–): δ 7.03-6.94 (m, 5H), 6.89 (s, 1H), 6.32 (s, 1H), 4.25 (s, 1H), 3.20-3.07 (m, 1H), 2.95-2.81 (m, 1H), 2.79-2.67 (m, 1H), 2.56-2.45 (m, 1H), 2.38 (s, 6H), 2.30 (s, 6H), 2.12 (s, 3H), 2.07-1.94 (m, 1H), 1.88-1.71 (m, 1H), −1.24 (s, 3H). $^{13}$C{$^1$H}NMR (CDCl$_3$): δ 146.35, 142.86, 142.25, 140.70, 140.34, 139.70, 137.92, 137.28, 136.92, 132.42, 129.15, 128.15, 128.01, 127.38, 125.10, 47.32, 33.42, 32.80, 26.15, 21.45, 21.36, 17.95, −5.50.

Rac-dimethylsilanedlylbis[2-methyl-4,8-di(3,5-dimethylphenyl)-1,5,6,7-tetrahydro-s-indacenyl]zirconium dichloride

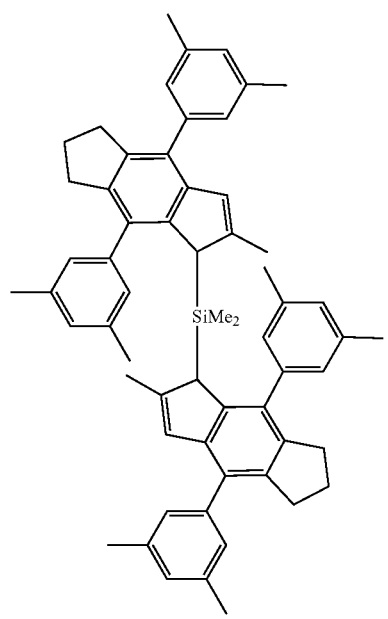

1. $^n$BuLi, PhMe
2. THF
3. ZrCl$_4$

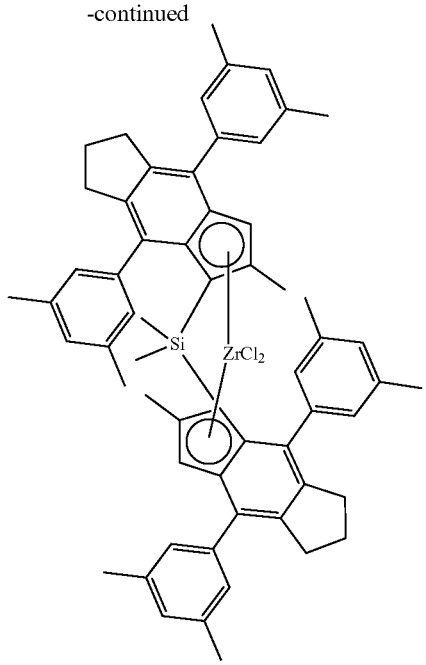

$^n$BuLi in hexanes (2.43 M, 6.5 ml, 15.8 mmol) was added at room temperature in one portion to a white suspension of bis[2-methyl-4,8-bis(3,5-dimethylphenyl)-1,5,6,7-tetrahydro-s-indacen-1-yl]dimethylsilane (6.38 g, 7.85 mmol) in 350 ml of toluene. This mixture was refluxed for 4 h, then the resulting dark-red solution was cooled to −40° C., and then 1.28 ml (1.138 g, 15.78 mmol) of THF followed by 1.83 g (7.85 mmol) of ZrCl$_4$ were added. The reaction mixture was stirred for 24 h at room temperature, then additionally refluxed for 3 h to give a dark-red solution with precipitate of LiCl. This mixture was evaporated to ca. 100 ml and filtered through glass frit (G4). The filtrate was evaporated to ca. 30 ml, and 20 ml of n-hexane was added. Yellow precipitate formed from this solution overnight at room temperature was collected and then dried under vacuum.

This procedure gave 0.85 g (11%) of rac-dimethylsilanediylbis[2-methyl-4,8-di(3,5-dimethylphenyl)-1,5,6,7-tetrahydro-s-indacenyl]zirconium dichloride [1H NMR 1605_2_2].

Anal. calc. for C$_{60}$H$_{62}$Cl$_2$SiZr: C, 74.04; H, 6.42. Found: C, 74.42; H, 6.55.

$^1$H NMR (CDCl$_3$): δ 7.50-7.01 (very br.s, 2H), 7.08 (s, 1H), 6.95 (s, 1H), 6.92 (s, 2H), 6.76 (s, 1H), 3.19-2.90 (m, 3H), 2.53-2.42 (m, 1H), 2.38 (s, 3H), 2.33 (s, 6H), 2.26 (s, 3H), 2.09 (s, 3H), 2.06-1.94 (m, 1H), 1.86-1.70 (m, 1H), −0.25 (s, 3H). $^{13}$C{$^1$H} NMR (CDCl$_3$): δ 144.49, 143.19, 141.39, 138.53, 137.90, 137.43, 133.63, 132.42, 131.79, 131.71, 131.63, 129.01, 128.69, 128.21, 127.64, 127.17, 123.01, 83.23, 33.65, 32.21, 26.07, 21.53, 21.39, 21.07, 20.26, 2.92.

In Table 1 it is shown that the inventive metallocene catalyst complexes are yielded with a higher selectivity and higher isolated yield of the anti-isomer than the comparative metallocene catalyst complexes.

TABLE 1
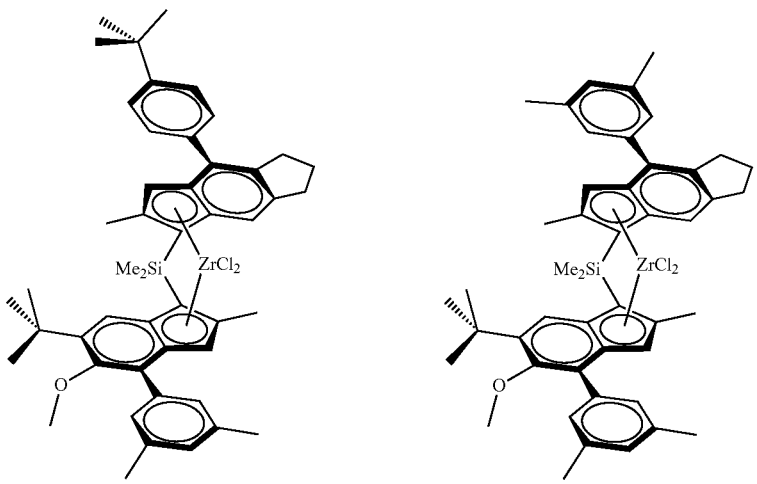
| | MC-C1 | MC-C2 |
|---|---|---|
| Anti-isomer selectivity % | ~50 | ~50 |
| isolated yield, % | 25 | 46 |
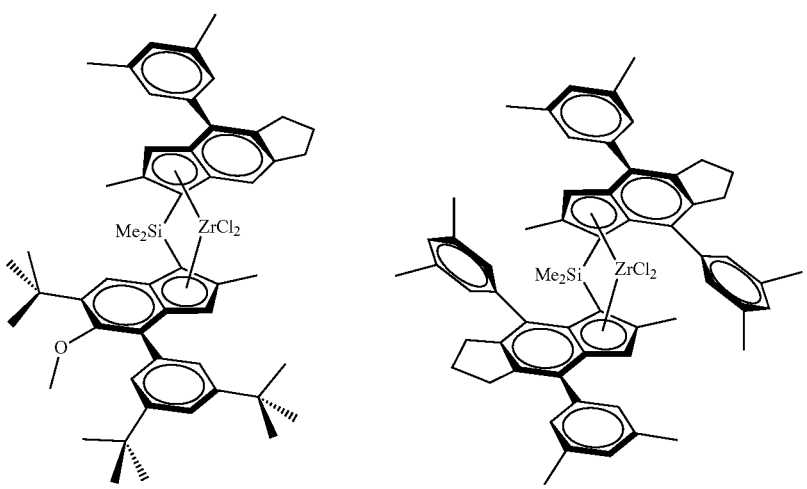
| | MC-C3 | MC-C4 |
|---|---|---|
| Anti-isomer selectivity % | ~50 | n.d. |
| isolated yield, % | 14 | 11 |

TABLE 1-continued

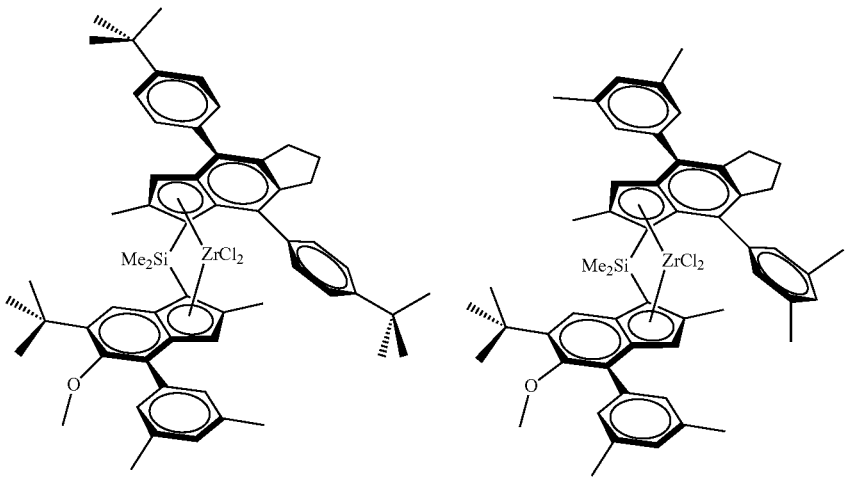

| | MC-1 | MC-2 |
|---|---|---|
| Anti-isomer selectivity, % | 75 | 85 |
| isolated yield, % | 46 | 55 |

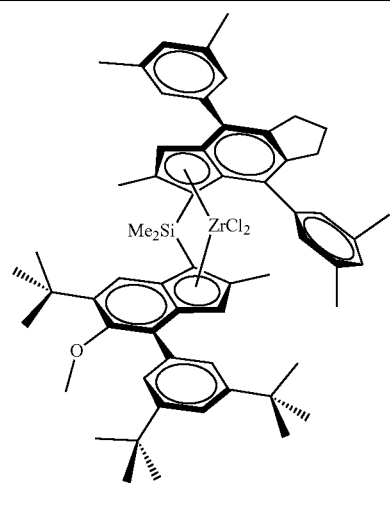

| | MC-3 |
|---|---|
| Anti-isomer selectivity, % | 90 |
| isolated yield, % | 49 |

Catalyst Synthesis, Used Chemicals

MAO was purchased from Chemtura/Lanxess and used as a 30 wt-% solution in toluene.

As surfactants were used perfluoroalkylethyl acrylate esters (CAS number 65605-70-1) purchased from the Cytonix corporation, dried over activated molecular sieves (2 times) and degassed by argon bubbling prior to use (S1) or 1H,1H-Perfluoro(2-methyl-3-oxahexan-1-ol) (CAS 26537-88-2) purchased from Unimatec, dried over activated molecular sieves (2 times) and degassed by argon bubbling prior to use (S2).

Hexadecafluoro-1,3-dimethylcyclohexane (PFC) (CAS number 335-27-3) was obtained from commercial sources and dried over activated molecular sieves (2 times) and degassed by argon bubbling prior to use. Propylene is provided by Borealis and adequately purified before use.

Triethylaluminum was purchased from Crompton and used in pure form. Hydrogen is provided by AGA and purified before use.

All the chemicals and chemical reactions were handled under an inert gas atmosphere using Schlenk and glovebox techniques, with oven-dried glassware, syringes, needles or cannulas.

As silica was used silica grade DM-L-303 from AGC Si-Tech Co, which was pre-calcined at 600° C.

Catalyst Preparations:

Comparative Catalyst 1—CE1: (Al/Zr=450 (mol/mol), Al/Surf.=167 (mol/mol)

Inside the glovebox, 85.3 mg of dry and degassed surfactant S2 was mixed with 2 mL of MAO in a septum bottle and left to react overnight. The following day, 42.4 mg MC-C1 (0,076 mmol, 1 equivalent) were dissolved with 4 mL of the MAO solution in another septum bottle and left to stir inside the glovebox.

After 60 minutes, 4 mL of the MAO-metallocene solution and 1 mL of the surfactant solution were successively added into a 50 mL emulsification glass reactor containing 40 mL of PFC at −10° C. and equipped with an overhead stirrer (stirring speed=600 rpm). Total amount of MAO is 5 mL (450 equivalents). A red emulsion formed immediately and stirred during 15 minutes at 0° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 45 minutes the solvent was siphoned off. The remaining red catalyst was dried during 2 hours at 50° C. under argon flow. 0.52 g of a red free flowing powder was obtained.

Inventive Catalyst 1—IE1: (Al/Zr=450 (mol/mol), Al/Surf.=250)

Inside the glovebox, 29.2 mg of dry and degassed surfactant S2 dilute in 0.2 mL toluene was added dropwise to 5 mL of 30 wt.-% Chemtura MAO. The solutions were left under stirring for 10 minutes. Then, 49.2 mg of metallocene MC-1 was added to MAO/surfactant.

After 60 minutes stirring, the surfactant-MAO-metallocene solution were added into a 50 mL emulsification glass reactor containing 40 mL of PFC at −10° C. and equipped with an overhead stirrer (stirring speed=600 rpm). A yellow emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. under argon flow. 0.80 g of a yellow free flowing powder was obtained.

Inventive Catalyst 2—IE2: (MC-2/Silica)

Preparation of MAO-Silica Support.

A steel reactor equipped with a mechanical stirrer and a filter net was flushed with nitrogen and the reactor temperature was set to 20° C. Next, pre-calcined silica grade DM-L-303 (7.4 kg) was added from a feeding drum followed by careful pressuring and depressurising with nitrogen using manual valves. Then toluene (32.2 kg) was added. The mixture was stirred (40 rpm) for 15 min. Next 30 wt % solution of MAO in toluene (17.5 kg) from Lanxess was added via 12 mm line on the top of the reactor within 70 min. The reaction mixture was then heated up to 90° C. and stirred at 90° C. for additional two hours. The slurry was allowed to settle and the mother liquor was filtered off. The catalyst was washed twice with toluene (32.2 kg) at 90° C., following by settling and filtration. The reactor was cooled off to 60° C. and the solid was washed with heptane (32.2 kg). Finally MAO treated S102 was dried at 60° C. for 2 h under nitrogen flow 2 kg/h, pressure 0.3 barg and then for 5 hours under vacuum (−0.5 barg) with stirring at 5 rpm. MAO treated support was collected as a free-flowing white powder found to contain 12% Al by weight.

Catalyst Preparation

In a nitrogen filled glovebox, a solution of MAO 0.2 mL (30% wt in toluene, Lanxess) in dry toluene (2.3 mL) was added to an aliquot of metallocene complex MC-2 (27 µmol). The mixture was stirred for 60 minutes at room temperature. Next, 2.0 g of MAO treated silica prepared as described above, was placed in a glass reactor equipped with a porous glass frit. A solution of MC-2 and MAO in toluene was then slowly added to the support over the course of 5 minutes with gentle mixing. The resulting mixture was shaken well and allowed to stay overnight. Then dry toluene (10 mL) was added, and the slurry was mixed well with the inert gas sparging through the filter net over 10 minutes. The solid was allowed to settle, and liquid was filtered off and discarded. The resulting cake was dried in vacuum for 1 hour to yield 2.0 g of the catalyst as pink free flowing powder.

Comparative Catalyst 2—CE2: (MC-C3/Silica)

Catalyst was prepared in the same manner as Catalyst of IE2, but using equivalent amount of comparative metallocene complex MC-C3 (27 µmol).

Comparative Catalyst 3—CE3: (MC-C4/Silica)

Catalyst was prepared in the same manner as Catalyst of IE2, but using equivalent amount of comparative metallocene complex MC-C4 (27 µmol).

Inventive Catalyst 3—IE3: (MC-3/Silica)

Preparation of MAO-Silica Support.

A glass reactor equipped with a mechanical stirrer was charged with pre-calcines silica grade DM-L-303 (10.0 g). Then dry toluene (50 mL) was added. The mixture was then heated to 35° C. and stirred at 35° C. (40 rpm) for 15 min. Next 30 wt % solution of MAO in toluene (25 mL) from Lanxess was added via cannula over the course of 25 minutes and then stirred for 2 more hours at 35° C. The solid was allowed to settle and the mother liquor was siphoned off and discarded. Toluene (50 mL) was added and the mixture was heated to 80° C. and stirred at this temperature for 1 hour. The solids were allowed to settle, and the liquid was siphoned off and discarded. The toluene wash was repeated two more times, followed by a heptane (50 mL) wash at 60° C. Then the cake was dried under vacuum at 60° C. over for hours to yield 13.7 g of support as white powder.

Catalyst Preparation

In a nitrogen filled glovebox, a solution of MAO 0.25 mL (30% wt in toluene, Lanxess) in dry toluene (1 mL) was added to an aliquot of metallocene MC-3 (38 µmol). The mixture was stirred for 60 minutes at room temperature. Next, 1.0 g of MAO treated silica prepared as described above, was placed in a glass vial. The solution of metallocene and MAO in toluene was then slowly added to the support over the course of 5 minutes with gentle mixing. The resulting mixture was shaken well and allowed to stay overnight. Then dry toluene (5 mL) was added, and the slurry was mixed well at 60° C. for 30 minutes. The solid was allowed to settle, and liquid was siphoned off and discarded. The wash with 5 mL toluene was repeated twice at room temperature. The resulting cake was dried in Ar flow for 3 hours at 60° C. to yield 1.0 g of the catalyst as pink free flowing powder Inventive Catalyst 4—IE4: (MC-2/Silica)

Catalyst was prepared in the same manner as Inventive Catalyst IE3, but using equivalent amount of inventive metallocene MC-2 (38 µmol, 35.4 mg).

Comparative Catalyst 4—CE4: (MC-C2/Silica)

Catalyst was prepared in the same manner as Inventive Catalyst of IE3, but using equivalent amount of comparative metallocene MC-C2 (38 µmol).

TABLE 2

Catalyst analysis of examples IE2, CE2 and CE3

| Catalyst example | MC | Al wt % | Zr wt % | Al/Zr Mol/mol | MC content based on Zr wt % | MAO content based on Al wt % |
|---|---|---|---|---|---|---|
| IE2 | MC-2 | 13 | 0.086 | 510 | 0.86 | 27.9 |
| CE2 | MC-C3 | 12 | 0.090 | 470 | 0.84 | 25.8 |
| CE3 | MC-C4 | 13 | 0.090 | 500 | 0.93 | 27.9 |

Polymerization Examples

Homopolymerization of Propylene with Catalysts of Examples CE1 and IE1 (Comparative Polymerisation Example PCE1 and Inventive Polymerisation Example PIE1)

The polymerizations were performed in a 5 litre jacketed stainless-steel reactor equipped with a stirrer, lines for monomer and hydrogen, an exhaust line and feeding systems for catalyst and scavenger.

The catalyst feeder comprises two stainless steel cylinders in series. Inside a glovebox, desired amount of catalyst (see Table 3) was loaded into the lower steel cylinder of the feeder and the second cylinder, containing 5 ml of dry Perfluoro-1,3-dimethylcyclohexane, was attached on top. The steel cylinder of the scavenger feeder was filled with 200 µl of triethylaluminum and 5 ml of dry pentane. Outside glovebox, the feed cylinders were attached to the reactor and the connections flushed with nitrogen. Reactor temperature was controlled to 20° C. The contents of the scavenger feeder was flushed into the reactor with nitrogen over pressure. Then, desired amount of hydrogen (see Table 3), followed by 1100 g of liquid propylene, was fed into the reactor. Stirring speed was set to 400 rpm. The reactor temperature was stabilised to 20° C. and after minimum of 5 minutes, the polymerization was started by injecting the catalyst into the reactor as described in the following. The valve between the two cylinders of the catalyst feeder was opened and the catalyst was then immediately flushed into the reactor with nitrogen over pressure. The feeder was pressurised three times with nitrogen and flushed into the reactor. Total nitrogen loading to reactor was about 0.42 mol.

After 5 minutes prepolymerization at 20° C., the reactor temperature was raised to 70° C. over a period of 15 minutes. The polymerization was continued at 70° C. for 60 minutes and then stopped by flushing the reactor to normal pressure. Polymer was collected after flushing the reactor with nitrogen several times, left to dry until constant mass was reached, and then weighed to record the yield.

The catalyst activity was calculated based on the 60 minute period according to the following formula:

$$\text{Catalyst Activity}\,(\text{kg-}PP/\text{g-}Cat/\text{h}) = \frac{\text{amount of polymer produced (kg)}}{\text{catalyst loading (g)} \times \text{polymerization time (h)}}$$

Polymerization conditions and results are disclosed in Table 3.

TABLE 3

Propylene bulk homopolymer results and polymer properties.

| Polymer. example | Catalyst Example | Catalyst (mg) | H2 (mmol) | Polymer (g) | Activity (kg-PP/g-cat/h) | Mw (kg/mol) | Mw/Mn | Tm (° C.) |
|---|---|---|---|---|---|---|---|---|
| PCE1 | CE1 | 7.7 | 6 | 250 | 32.5 | 510 | 2.7 | 151 |
| PIE1 | IE1 | 11.8 | 6 | 678 | 57.5 | 520 | 2.6 | 152 |

The overall performance obtained with the new metallocene of the invention is better than with the comparative example: high activity in homopolymerization, good homopolymer melting temperature and good molecular weight capability.

Homopolymerisation of Propylene and Copolymerisation of Propylene with Hexene Using Silica Supported Metallocene Catalysts (Comparative Polymerisation Examples PCE2 and PCE3; Inventive Polymerisation Examples PIE2 and PIE3)

Hexene Feed

Hexene was purified in the M-Braun solvent station, transferred via fixed line to the syringe pump, and then fed via the syringe pump into the reactor before adding the triethylaluminium.

hPP or C3C6 at 75° C. in Bulk

A stainless-steel reactor equipped with a ribbon stirrer, with a total volume of 20.9 dm³ containing 0.2 bar-g propylene, is filled with additional 4.45 kg propylene and the chosen amount of 1-hexene. Triethylaluminium (0.8 ml of 0.62 molar solution in n-heptane) is added using a stream of 250 g propylene, then 1.44 NL of H2 is added via mass flow controller in one minute. The reactor temperature is stabilized at 20° C. (HB-Therm) and the solution is stirred and 250 rpm for at least 20 min.

The desired amount of solid, catalyst is loaded into a 5 ml stainless steel vial inside a glovebox, then a second 5 ml vial containing 4 ml n-heptane and pressurized with 10 bars of nitrogen is added on top of it. This dual feeder system is mounted on a port on the lid of the autoclave. The valve between the two vials is opened and the solid catalyst is contacted with n-heptane under N2 pressure for 2 s, and then flushed into the reactor with 250 g propylene. Stirring speed is kept at 250 rpm and pre-polymerisation is run for 10 minutes at 20° C. Then the polymerisation temperature is increased to 75° C. The reactor temperature is kept constant throughout the polymerization. The polymerization time is measured starting when the temperature is 2° C. below the set polymerization temperature. When the polymerization time of 60 min has lapsed, the reaction is stopped by injecting 5 ml ethanol, cooling the reactor and simultaneously flashing the volatile components. After purging the reactor 3 times with N2 and one vacuum/N2 cycle, the reactor is opened, the polymer powder is taken out and dried overnight in a fume hood. 100 g of the polymer is additivated with 0.5 wt % Irganox B225 (dissolved in acetone) and then dried overnight in a fume hood and additionally one hour in a vacuum drying oven at 60° C. Results are disclosed in Tables 4A and 4B.

TABLE 4A

Propylene homopolymerisation and propylene/hexene copolymerisation settings and results

| Polymerisation example | Catalyst Ex | MC | mg | MC content of catalyst (from ICP) wt % | H2 feed before prepolym. NL | Hexene feed g | Catalyst activity kg/ $g_{cat}$/h | MC activity kg/$g_{MC}$/h |
|---|---|---|---|---|---|---|---|---|
| PCE2 | CE3 | MC-C4 | 52 | 0.93 | 2.02 | 0 | 20.0 | 2148 |
| PCE3 | CE3 | MC-C4 | 63 | 0.93 | 2.02 | 102 | 16..9 | 1814 |
| PIE2 | IE2 | MC-2 | 61 | 0.86 | 2.02 | 0 | 27.1 | 3147 |
| PIE3 | IE2 | MC-2 | 56 | 0.86 | 2.02 | 102 | 23.0 | 2672 |

TABLE 4B

Propylene homopolymerisation and propylene/hexene copolymerisation results

| Polymerisation Experiment | MFR$_2$ powder g/10 min | Powder bulk density g/ml | C6 (IR-MMR) wt % | Tm ° C. |
|---|---|---|---|---|
| PCE2 | 5.1 | 0.40 | 0 | 156 |
| PCE3 | 18.1 | 0.46 | 2.4 | 139 |
| PIE2 | 1.8 | 0.43 | 0 | 151 |
| PIE3 | 15.6 | 0.44 | 2.1 | 137 |

As can be seen from the results, the catalyst activity and MC-activity with inventive catalysts is higher in both propylene homopolymerisation and with hexane copolymerisation. In addition MFR$_2$ of the polymers of the inventive examples is lower indicating higher molecular weight of the polymer.

Homopolymerisation of Propylene and Copolymerisation of Propylene with Ethylene (Heterophasic Copolymers) Using Silica Supported Metallocene Catalysts (Comparative polymerisation examples PCE3, PCE4 and PCE5; inventive polymerisation example PIE4)

Step 1: Prepolymerisation and Bulk Homopolymerisation

A stainless-steel reactor equipped with a ribbon stirrer, with a total volume of 20.9 dm$^3$ containing 0.2 bar-g propylene is filled with additional 3950 g propylene. Triethylaluminum (0.80 ml of a 0.62 molar solution in heptane) is injected into the reactor by additional 240 g propylene, then 2.0 NL of hydrogen is added via mass flow controller in one minute. The solution is stirred at 20° C. and 250 rpm for at least 20 min. The desired amount of solid, catalyst is loaded into a 5 ml stainless steel vial inside a glovebox and a second 5 ml vial containing 4 ml n-heptane pressurized with 10 bars of nitrogen is added on top of the first vial. This catalyst feeder system is mounted on a port on the lid of the reactor, The valve between the two vials is opened and the solid catalyst is contacted with heptane under nitrogen pressure for 2 s, then flushed into the reactor with 240 g propylene. The prepolymerisation is run for 10 min. At the end of the prepolymerisation step the temperature was raised to 80° C. In some experiments, additional hydrogen is fed, when the internal reactor temperature has reached 75° C., see tables for values) is added via mass flow controller in one minute. The reactor temperature is kept constant at 80° C. throughout the polymerisation. The polymerisation time is measured starting when the internal reactor temperature reached 2° C. below the set polymerisation temperature.

Step 2:

Gas Phase Ethylene-Propylene Copolymerisation

After the homopolymerisation step is completed, the stirrer speed is reduced to 50 rpm and the pressure is reduced down to 0.3 bar-g by venting the monomers. Then triethylaluminum (0.80 ml of a 0.62 mol/l solution in heptane) is injected into the reactor by additional 250 g propylene through a steel vial. The pressure is then again reduced down to 0.3 bar-g by venting the monomers. The stirrer speed is set to 180 rpm and the reactor temperature is set to 70° C. Then the reactor pressure is increased to 20 bar-g by feeding a C3/C2 gas mixture of composition defined by:

$$\left(\frac{C_2}{C_3}\right)_{gas\ feed\ in\ transition} = \frac{\left(\frac{C_2}{C_3}\right)_{target\ polymer\ composition}}{R}$$

where C2/C3 is the weight ratio of the two monomers and R is their reactivity ratio, determined experimentally. In the present experiments, R=0.50.

The temperature is held constant by thermostat and the pressure is kept constant by feeding via mass flow controller a C3/C2 gas mixture of composition corresponding to the target polymer composition and, until the set duration for this step has lapsed.

Then the reactor is cooled down to about 30° C. and the volatile components flashed out. After purging the reactor 3 times with N2 and one vacuum/N2 cycle, the product is taken out and dried overnight in a fume hood. 100 g of the polymer is additivated with 0.5 wt % Irganox B225 (solution in acetone) and dried overnight in a hood followed by 2 hours in a vacuum drying oven at 60° C. Results are disclosed in Tables 5 and 6.

TABLE 5

Heterophasic copolymers: experimental settings

| Polym-example | Catalysts | | MC content of cat. | Transition | | Gas phase | | Overall productivity | MC productivity |
|---|---|---|---|---|---|---|---|---|---|
| | Ex | MC | | C2 feed | C3 feed | C2 feed | C3 feed | | |
| | | | mg | wt % | g | g | g | g | Kg/gcat | Kg/g$_{MC}$ |
| PCE4 | CE4 | MC-C2 | 90 | n.m. | 234 | 339 | 80 | 250 | 14.1 | n.m |
| PCE5 | CE3 | MC-C4 | 54 | 0.93 | 234 | 345 | 21 | 63 | 16.7 | 1798 |
| PCE6 | CE2 | MC-C3 | 59 | 0.84 | 230 | 339 | 77 | 239 | 19.7 | 2343 |
| PIE4 | IE2 | MC-2 | 52 | 0.86 | 239 | 346 | 40 | 121 | 24.4 | 2838 |

TABLE 6

Heterophasic copolymers: experimental results

| Polym. Example | MFR2 powder g/10 min | XS wt % | Tm °C. | IV* (Crystex) dl/g | C2(XS)* from IR % |
|---|---|---|---|---|---|
| PCE4 | 0.6 | 24.7 | 153 | 3.6 | 22.5 |
| PCE5 | 4.0 | 9.3 | 157 | 4.4 | 26.1 |
| PCE6 | 2.1 | 29.9 | 155 | 2.3 | 23.1 |
| PIE4 | 2.6 | 14.4 | 150 | 4.7 | 23.3 |

*xylene soluble fraction

Inventive example PIE4 shows clearly better overall and MC productivity than the comparative examples PCE4-PCE6. Further, IV in the inventive example is higher with the similar amount of ethylene than in the comparative examples.

The invention claimed is:

1. A metallocene catalyst complex of formula (I):

Formula (I)

[Chemical structure diagram showing metallocene complex with substituents $R^3$, $R^3$, $R^3$, $R^2_n$, $R^1$, $R_2Si$, $MtX_2$, $R^1$, $R^3$, $R^3$, $R^6$, $R^5O$, $R^4$, $R^4$, $R^4$]

wherein
Mt is Hf or Zr;
each X is a sigma-ligand,
each $R^1$ independently is the same or different and is a $CH_2$—$R^7$ group, with $R^7$ being H, a linear or branched $C_{1-6}$-alkyl group, a $C_{3-8}$ cycloalkyl group, or a $C_{6-10}$ aryl group,
each $R^2$ is independently a —$CH_2$—, —CHY— or —$CY_2$— group, wherein Y is a $C_{1-10}$ hydrocarbyl group and where n is 3-6,
each $R^3$ and $R^4$ are independently the same or different and are hydrogen, a linear or branched $C_1$-$C_6$-alkyl group, an OY group, a $C_{7-20}$ arylalkyl, $C_{7-20}$ alkylaryl group, or $C_{6-20}$ aryl group, wherein at least one $R^3$ per phenyl group and at least one $R^4$ is not hydrogen, and optionally two adjacent $R^3$ or $R^4$ groups form a ring including the phenyl carbons to which they are bonded,
$R^5$ is a linear or branched $C_1$-$C_6$-alkyl group, $C_{7-20}$ arylalkyl, $C_{7-20}$ alkylaryl group, or $C_{6-20}$-aryl group,
$R^6$ is a C($R^8$)$_3$ group, with $R^8$ being a linear or branched $C_1$-$C_6$ alkyl group, and
each R is independently a $C_1$-$C_{20}$-hydrocarbyl, $C_6$-$C_{20}$-aryl, $C_7$-$C_{20}$-arylalkyl, or $C_7$-$C_{20}$-alkylaryl.

2. The metallocene catalyst complex according to claim 1, wherein
Mt is Zr,
each X is independently a hydrogen atom, a halogen atom, $C_{1-6}$ alkoxy group, or an R' group, where R' is a $C_{1-6}$ alkyl, phenyl, or benzyl group,
each R is independently a $C_1$-$C_{20}$-hydrocarbyl, $C_6$-$C_{20}$-aryl, $C_7$-$C_{20}$-arylalkyl, or $C_7$-$C_{20}$-alkylaryl,
each $R^1$ independently is the same or different and is a $CH_2$—$R^7$ group, with $R^7$ being H, a linear or branched $C_{1-6}$-alkyl group, or a $C_{6-10}$ aryl group,
each $R^2$ is independently a —$CH_2$—, —CHY— or —$CY_2$— group, wherein Y is a $C_{1-4}$ hydrocarbyl group and where n is 3-4,
each $R^3$ and $R^4$ are independently the same or different and are hydrogen, a linear or branched $C_1$-$C_6$-alkyl group, or $C_{6-20}$ aryl groups, wherein at least one $R^3$ per phenyl group and at least one $R^4$ is not hydrogen,
$R^5$ is a linear or branched $C_1$-$C_6$ alkyl group or $C_{6-20}$ aryl group, and
$R^6$ is a C($R^8$)$_3$ group, with $R^8$ being a linear or branched $C_1$-$C_4$ alkyl group.

3. The metallocene catalyst complex according to claim 1, wherein
Mt is Zr,
each X is independently a chloride, benzyl, or a methyl group,
each R is independently a $C_1$-$C_{10}$-hydrocarbyl or $C_6$-$C_{10}$-aryl group,
both $R^1$ are the same and are a $CH_2$—$R^7$ group, with $R^7$ being H or a linear or branched $C_1$-$C_3$-alkyl group,
each $R^2$ is independently a —$CH_2$—, —CHY— or —$CY_2$— group, wherein Y is a $C_{1-4}$ hydrocarbyl group and where n is 3-4,
each $R^3$ and $R^4$ are independently the same or different and are hydrogen, a linear or branched $C_1$-$C_6$-alkyl group, or $C_{6-20}$ aryl groups, wherein at least one $R^3$ per phenyl group and at least one $R^4$ is not hydrogen,
$R^5$ is a linear or branched $C_1$-$C_6$ alkyl group or $C_{6-20}$ aryl group and $R^6$ is a $C(R^8)_3$ group, $R^8$ being the same and being a $C_1$-$C_2$-alkyl group.

4. The metallocene catalyst complex according to claim 1, the complex having formula (Ia)

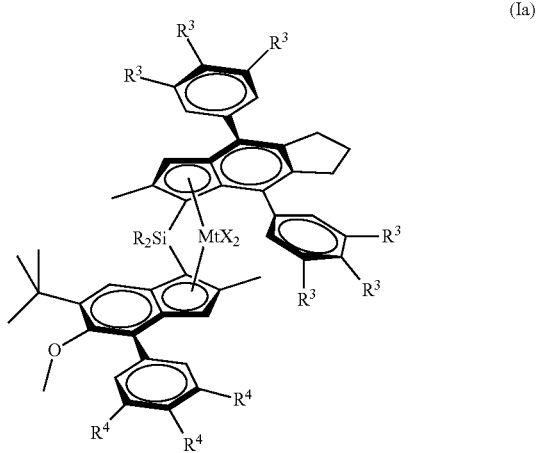

(Ia)

wherein each $R^3$ and $R^4$ are independently the same or different and are hydrogen or a linear or branched $C_1$-$C_6$-alkyl group, wherein at least one $R^3$ per phenyl group and at least one $R^4$ is not hydrogen.

5. The metallocene catalyst complex according to claim 4, wherein;
one or two $R^3$ groups per phenyl group are not hydrogen and the remaining $R^3$ groups are hydrogen, and both $R^3$-substituted phenyl groups are identical, and
for the indenyl moiety, two $R^4$ on the phenyl group are not hydrogen and these two $R^4$ are the same.

6. The metallocene catalyst complex according to claim 1 wherein the complex is:
rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl] zirconium dichloride;
rac-anti-dimethylsilanediyl[2-methyl-4,8-bis-(3',5'-dimethylphenyl)-1,5,6,7-tetrahydro-s indacen-1-yl][2-methyl-4-(3',5'-dimethylphenyl)-5-methoxy-6-tert-butylinden-1-yl] zirconium dichloride;
rac-anti-dimethylsilanediyl[2-methyl-4,8-bis-(3',5'-dimethylphenyl)-1,5,6,7-tetrahydro-s-indacen-1-yl][2-methyl-4-(3',5'-ditert.-butyl-phenyl)-5-methoxy-6-tert-butylinden-1-yl]zirconium dichloride;
or their corresponding zirconium dimethyl analogues.

7. A catalyst system comprising:
(i) the metallocene catalyst complex according to claim 1; and
(ii) a cocatalyst comprising a compound of a group 13 metal.

8. The catalyst system according to claim 7, wherein cocatalyst (ii) is selected from the group consisting of alumoxane, combinations of alumoxane with Al-alkyls, boron or borate cocatalysts, and combinations of alumoxanes with boron-based cocatalysts.

9. The catalyst system as claimed in claim 7, wherein the catalyst system is in solid form, being supported on an external carrier or being in solid particulate form free from an external carrier.

10. The catalyst system as claimed in claim 9, wherein the catalyst system is supported on silica.

11. The metallocene catalyst complex according to claim 1, wherein the ligand compound of the metallocene catalyst complex of formula (I) comprising the two $(R^3)_3$-phenyl-group substituents is prepared by a process comprising steps 1) to 4):
1) a starting ketone-compound, $R^1$-3,5,6,7-tetrahydro-s-indecen-1(2H)-one, is dibrominated electrophilically;
2) the obtained corresponding dibromo-compound from step 1, 4,8-dibromo-$R^1$-3,5,6,7-tetrahydro-s-indecen-1(2H)-one, is reduced and followed by methylation to yield the corresponding OMe-compound;
3) the obtained corresponding OMe-compound from step 2 is Kumada coupled with $(R^3)_3$-phenylmagnesium bromide; and
4) the compound from step 3 is demethoxylated;
and wherein $R^1$ and $R^3$ are as defined in claim 1.

12. A process for the preparation of a polypropylene homopolymer, a propylene-ethylene copolymer, or a propylene-C4-10 alpha olefin copolymer comprising polymerizing propylene, propylene and ethylene, or propylene and a C4-10 alpha olefin, in the presence of the catalyst system according to claim 7.

* * * * *